United States Patent [19]
Nishidai

[11] Patent Number: 5,604,842
[45] Date of Patent: Feb. 18, 1997

[54] FUZZY REASONING PROCESSOR AND METHOD, AND RULE SETTING APPARATUS AND METHOD

[75] Inventor: Hajime Nishidai, Kyoto, Japan

[73] Assignee: Omron Corporation, Japan

[21] Appl. No.: 881,855

[22] Filed: May 12, 1992

[30] Foreign Application Priority Data

May 15, 1991 [JP] Japan .................................. 3-138663
May 16, 1991 [JP] Japan .................................. 3-139452

[51] Int. Cl.$^6$ .............................. G05B 13/00; G06F 9/44
[52] U.S. Cl. ............................................. 395/61; 395/900
[58] Field of Search ................................. 395/3, 51, 61, 395/900

[56] References Cited

U.S. PATENT DOCUMENTS

| | | | |
|---|---|---|---|
| 4,755,960 | 7/1988 | Batson et al. ..................... | 364/715.02 |
| 4,875,184 | 10/1989 | Yamakawa ......................... | 395/3 |
| 5,012,430 | 4/1991 | Sakurai ............................... | 395/61 |
| 5,179,625 | 1/1993 | Hisano ................................. | 395/3 |
| 5,185,849 | 2/1993 | Miyazawa et al. ................. | 395/3 |
| 5,191,638 | 3/1993 | Wakami et al. .................... | 395/51 |
| 5,214,773 | 5/1993 | Endo .................................... | 395/61 |
| 5,239,616 | 8/1993 | Hisano ................................. | 395/61 |
| 5,243,687 | 9/1993 | Ando et al. ......................... | 395/3 |
| 5,261,036 | 11/1993 | Nakano ................................ | 395/51 |
| 5,280,565 | 1/1994 | Nomoto et al. .................... | 395/51 |

FOREIGN PATENT DOCUMENTS

| | | | |
|---|---|---|---|
| 209226 | 5/1991 | European Pat. Off. ........ | G06F 7/00 |
| 424890 | 5/1991 | European Pat. Off. ........ | G05B 19/05 |

OTHER PUBLICATIONS

Abstract, Patent Abstracts of Japan, vol. 13, No. 511 (P-961) 16 Nov. 1989 & JP-A-01 206 435 (Matshushita Electric Ind. Co., Ltd.).
Lim et al, "Implementing Fuzzy Rule Based Systems on Silicon Chips", IEEE Expert vol. 5 Iss 1 Feb. 1990, pp. 31-45.
IBM Technical Disclosure Bulletin, vol. 34, No. 78, Dec. 1991, pp. 461-463 (Fast Fuzzy Inference Engine).

*Primary Examiner*—Robert W. Downs
*Attorney, Agent, or Firm*—Dickstein Shapiro Morin & Oshinsky LLP

[57] ABSTRACT

A plurality of rules each constituted by providing pairs of input variables and membership functions in its antecedent and a pair of an output variable and a membership function provided in its consequent are set in a RAM. Antecedent processing is executed for each input variable in such a manner as to perform antecedent processing, when input data is received, with regard to all rules to which an input variable of the received input data is related. Then antecedent processing is performed when another input data for another input variable received with regard to all rules to which such another input variable of the received input data is related. Consequently, fuzzy reasoning processing is efficiently performed.

9 Claims, 26 Drawing Sheets

Fig. 3

| | | | | | | | | | |
|---|---|---|---|---|---|---|---|---|---|
| RULE 1 | If | x1=PL | & | x2=PL | & | x3=S | & | x4=PL | then y1=PL |
| RULE 2 | If | x1=PL | & | x2=PM | & | x3=S | & | x4=S | then y1=PL |
| RULE 3 | If | x1=PM | & | x2=PS | & | x3=S | & | x4=S | then y1=PM |
| RULE 4 | If | x1=ZR | & | x2=ZR | & | x3=S | & | x4=S | then y1=PS |
| RULE 5 | If | x1=NL | & | x2=NL | & | x3=PL | & | x4=S | then y1=PS |
| RULE 6 | If | x1=NL | & | x2=S | & | x3=PM | & | x4=S | then y1=ZR |
| RULE 7 | If | x1=PM | & | x2=S | & | x3=NL | & | x4=S | then y1=NS |
| RULE 8 | If | x1=NS | & | x2=S | & | x3=ZR | & | x4=ZR | then y1=ZR |
| RULE 9 | If | x1=NM | & | x2=S | & | x3=S | & | x4=NM | then y1=NL |
| RULE 10 | If | x1=PS | & | x2=S | & | x3=S | & | x4=NL | then y1=NM |
| .... | | | | | | | | | |

Fig.8

```
START CODE:INPUT x1
  RULE 1         P L
  RULE 2         P L
  RULE 3         P M
  RULE 4         Z R
  RULE 5         N L
  RULE 6         N L
  RULE 7         P M
  RULE 8         N S
  RULE 9         N M
  RULE10         P S
   ⋮              ⋮

START CODE:INPUT x2
  RULE 1         P L
  RULE 2         P M
  RULE 3         P S
  RULE 4         Z R
  RULE 5         N L
   ⋮              ⋮

START CODE:INPUT x3
  RULE 5         P L
  RULE 6         P M
  RULE 7         N L
  RULE 8         Z R
   ⋮              ⋮

START CODE:INPUT x4
  RULE 8         Z R
  RULE 9         N M
  RULE10         N L
   ⋮              ⋮

START CODE : M A X
  P L          (RULE 1)
  P L          (RULE 2)
  P M          (RULE 3)
  P S          (RULE 4)
  P S          (RULE 5)
  Z R          (RULE 6)
  Z R          (RULE 8)
  N S          (RULE 7)
  N M          (RULE10)
  N L          (RULE 9)
   ⋮              ⋮
```

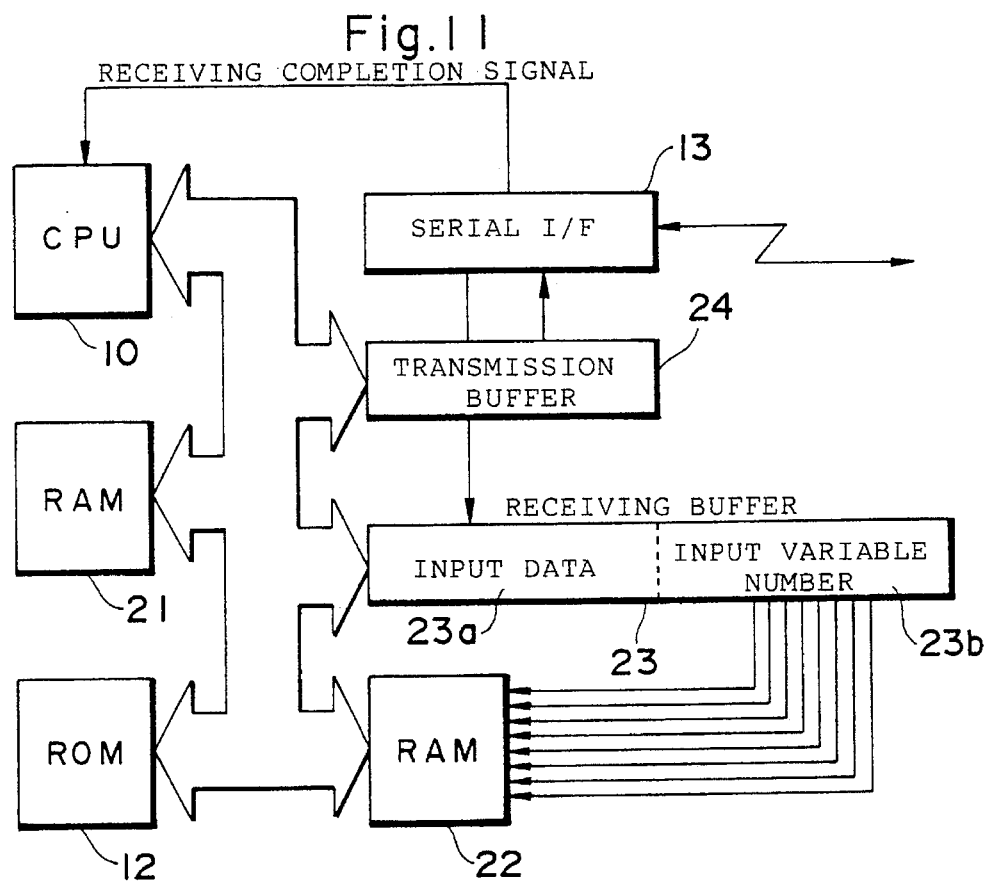
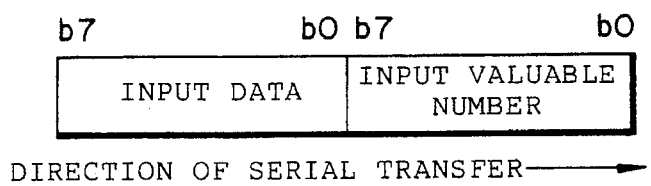

Fig. 14

| INPUT x1 | | INPUT x2 | |
|---|---|---|---|
| RULE1 | PL | RULE1 | PL |
| RULE2 | PL | RULE2 | PM |
| RULE3 | PM | RULE3 | PS |
| RULE4 | ZR | RULE4 | ZR |
| RULE5 | NL | RULE5 | NL |
| RULE6 | NL | ⋮ | ⋮ |
| RULE7 | PM | | END |
| RULE8 | NS | | |
| RULE9 | NM | | |
| RULE10 | PS | | |
| ⋮ | ⋮ | | |
| | END | | |

| INPUT x3 | | INPUT x4 | |
|---|---|---|---|
| RULE5 | PL | RULE8 | ZR |
| RULE6 | PM | RULE9 | NM |
| RULE7 | NL | RULE10 | NL |
| RULE8 | ZR | ⋮ | ⋮ |
| ⋮ | ⋮ | | END |
| | END | | |

MAX

| | |
|---|---|
| PL | (RULE1) |
| PL | (RULE2) |
| PM | (RULE3) |
| PS | (RULE4) |
| PS | (RULE5) |
| ZR | (RULE6) |
| ZR | (RULE8) |
| NS | (RULE7) |
| NM | (RULE10) |
| NL | (RULE9) |
| ⋮ | ⋮ |
| | END |

Fig.28

| ADDRESS | |
|---|---|
| LA | NUMBER OF RULES INCLUDING PAIR x1 − PL (2) |
| LA+1 | NUMBER OF RULES INCLUDING PAIR x1 − PM (2) |
| LA+2 | NUMBER OF RULES INCLUDING PAIR x1 − PS (1) |
| LA+3 | NUMBER OF RULES INCLUDING PAIR x1 − ZR (1) |
| LA+4 | NUMBER OF RULES INCLUDING PAIR x1 − NS (1) |
| LA+5 | NUMBER OF RULES INCLUDING PAIR x1 − NM (1) |
| LA+6 | NUMBER OF RULES INCLUDING PAIR x1 − NL (2) |
| LA+7 | NUMBER OF RULES INCLUDING PAIR x2 − PL (1) |
| LA+8 | NUMBER OF RULES INCLUDING PAIR x2 − PM (1) |
| LA+9 | NUMBER OF RULES INCLUDING PAIR x2 − PS (1) |
| LA+10 | NUMBER OF RULES INCLUDING PAIR x2 − ZR (1) |
| LA+11 | NUMBER OF RULES INCLUDING PAIR x2 − NS (0) |
| LA+12 | NUMBER OF RULES INCLUDING PAIR x2 − NM (0) |
| LA+13 | NUMBER OF RULES INCLUDING PAIR x2 − NL (1) |
| LA+14 | NUMBER OF RULES INCLUDING PAIR x3 − PL (1) |
| LA+15 | NUMBER OF RULES INCLUDING PAIR x3 − PM (1) |
| LA+16 | NUMBER OF RULES INCLUDING PAIR x3 − PS (0) |
| ⋮ | ⋮ (NUMBER-OF-RULES AREA) |
| LA+26 | NUMBER OF RULES INCLUDING PAIR x4 − NM (1) |
| LA+27 | NUMBER OF RULES INCLUDING PAIR x4 − NL (1) |

Fig.29

| ADDRESS | | |
|---|---|---|
| RU | RULE NUMBER OF RULE INCLUDING PAIR x1−PL (1) | NUMBER OF RULES: 2 |
| RU+1 | RULE NUMBER OF RULE INCLUDING PAIR x1−PL (2) | |
| RU+2 | RULE NUMBER OF RULE INCLUDING PAIR x1−PM (3) | NUMBER OF RULES: 2 |
| RU+3 | RULE NUMBER OF RULE INCLUDING PAIR x1−PM (7) | |
| RU+4 | RULE NUMBER OF RULE INCLUDING PAIR x1−PS (10) | |
| ⋮ | ⋮ | |
| RU+10 | RULE NUMBER OF RULE INCLUDING PAIR x2−PL (1) | |
| RU+11 | RULE NUMBER OF RULE INCLUDING PAIR x2−PM (2) | |
| ⋮ | ⋮ (RULE NUMBER AREA) | |
| RU+21 | RULE NUMBER OF RULE INCLUDING PAIR x4−NM (9) | |
| RU+22 | RULE NUMBER OF RULE INCLUDING PAIR x4−NL (10) | |

FUZZY REASONING PROCESSOR AND METHOD, AND RULE SETTING APPARATUS AND METHOD

BACKGROUND OF THE INVENTION

1. Field of the Invention

The present invention relates to a fuzzy reasoning processor and a fuzzy reasoning processing method.

2. Description of the Background Art

When a decision and a fault diagnosis are made and automatic control of a controlled object having strong non-linearity is carried out utilizing the so-called knowhow and empirical rule of a skilled engineer or technician which are difficult to strictly represent by equations and the like, fuzzy reasoning processing has been widely used. The fuzzy reasoning processing is executed by an analog or digital processor having architecture dedicated to fuzzy reasoning processing or a general purpose digital computer so programmed as to allow a fuzzy operation.

Fuzzy reasoning processing is executed in accordance with the so-called "If . . . , then . . ." rule. Examples of the "If . . . , then . . . " rule are as follows:

Rule 1: If $x1=PL$ and $x2=PL$ and $x4=PL$,
then $y1=PL$

Rule 2: If $x1=PL$ and $x2=PM$,
then $y1=PL$

Rule i: If $x1=NL$ and $x3=PM$,
then $y1=ZR$

Here "If . . . ," is referred to as an "antecedent" and "then . . . " is referred to as a "consequent". $x1$, $x2$, $x3$ and $x4$ are input variables, and $y1$ is an output variable. PL, PM, NL, ZR and the like are labels of membership functions representing items of linguistic information.

A fuzzy reasoning operation is executed in the following manner.

First, in antecedent processing, the degree of conformity of input data to a corresponding membership function is found. For example, in the rule 1, the degrees of conformity $a11$, $a12$ and $a14$ of input data concerning the input variables $x1$, $x2$ and $x4$ (the input data are also expressed by reference signs $x1$, $x2$ and $x4$) to the membership function PL are respectively found. The degree of conformity means a value of a membership function obtained when input data is given to the membership function (a function value or a grade). A predetermined operation (a MIN operation is most commonly employed as this operation) of the degrees of conformity $a11$, $a12$ and $a14$ in the rule 1 is executed, and the result $a1$ of the operation is the degree of conformity in the rule 1.

Similarly, in the rule 2, the degree of conformity $a21$ of the input data $x1$ to the membership function PL and the degree of conformity $a22$ of the input data $x2$ to the membership function PM are respectively found. The result of a predetermined operation (a MIN operation) of the degrees of conformity $a21$ and $a22$ is the degree of conformity $a2$ in the rule 2.

The degree of conformity for each rule is found by the same operation processing with regard to the other rules.

A check is made to see whether or not there exist a plurality of rules having the same consequent. For example, both the rule 1 and the rule 2 have the same consequent, i.e., $y1=PL$. A predetermined operation (a MAX operation is most commonly employed as the operation) of the degrees of conformity is performed between such rules having the same consequent, to obtain the final degree of conformity A1.

When there exist no other rules having the same consequent, the degree of conformity for each rule is preserved without any modification.

Consequent processing is then performed. In the consequent processing, processing for exerting the degree of conformity for each rule previously obtained on a membership function described in a consequent of the rule is performed. For example, the rule 1 and the rule 2 have the same consequent, i.e., $y1=PL$. Since the degree of conformity in the rules 1 and 2 is A1, the degree of conformity A1 is exerted on the membership function PL in the consequent (a MIN operation of the degree of conformity A1 and the membership function PL, that is, truncation is widely performed as this operation). Furthermore, in the rule i, processing for exerting the degree of conformity $ai$ obtained in antecedent processing with regard to the rule i on the membership function ZR in the consequent is performed.

The result of an operation for each label of a membership function in a consequent thus obtained is also one type of membership function. An operation (for example, a MAX operation) between the membership functions is executed, to obtain the final result of reasoning.

In the application of automatic control or the like, a manipulated variable given to a controlled object must be derived. Therefore, an operation of defuzzifying the final result of reasoning (referred to as determinant operation processing) is executed. Examples of the operation include a method of center of gravity and a method of maximum height. The method of center of gravity is one of calculating the position of the center of gravity of the final result of reasoning and taking the position of the center of gravity as a final output. The method of maximum height is one of determining a label of a membership function of the highest grade out of membership functions in consequents after consequent processing. This method is frequently used when fuzzy reasoning is utilized for decision making. In this case, the membership function in the consequent is often expressed by a singleton.

There is generally no limit to the order in which the above described plurality of rules are described (set). Consequently, a designer prepares and describes rules or inputs and sets the rules in a processor or a computer in an arbitrary order. Within the processor or the computer, the above described series of processing and particularly, the antecedent processing is executed in the order in which the rules are described (set).

Consequently, fuzzy reasoning processing cannot be started unless input data concerning all input variables included in a plurality of rules set are gathered. The processor or the computer confirms whether or not all input data are inputted in starting the fuzzy reasoning processing.

According to such a conventional method, long waiting time is required to start fuzzy reasoning when there are many types of input variables and when it takes long to input input data. An example of the latter case includes a case where input data are serially transmitted to a fuzzy processor from host apparatuses such as a main CPU.

In either case, a time period elapsed from the time when input data are inputted or transferred until the fuzzy reasoning processing is started (overhead) is long, thereby to reduce the entire processing efficiency.

SUMMARY OF THE INVENTION

An object of the present invention is to improve the entire processing efficiency.

A fuzzy reasoning processing method according to the present invention comprises the steps of previously setting a plurality of rules each relating a plurality of input variables of antecedent with at least one output variable of consequent using membership functions, and executing antecedent processing for each input variable in such a manner as to perform antecedent processing with regard to all rules to which such one input variable is related that input data is given and then, perform antecedent processing with regard to all rules to which such another input variable is related that input data is given.

A fuzzy reasoning processor according to the present invention comprises a memory for storing therein a plurality of rules each relating a plurality of input variables of antecedent with at least one output variable of consequent using membership functions, antecedent processing means for executing antecedent processing with regard to all rules to which an input variable of input data given is related, and means for carrying out such control as to give, after antecedent processing is terminated with regard to one input variable by the above described antecedent processing means, input data concerning another input variable to the above described antecedent processing means and execute antecedent processing with regard to the another input variable.

In one embodiment of the present invention, antecedent processing is executed, when input data is given, with regard to all rules to which an input variable of the given input data is related.

In another embodiment of the present invention, input data given is temporarily stored in storage means. Input data stored in the above described storage means are sequentially read out, and antecedent processing is executed with regard to all rules to which an input variable of the input data read out is related.

When input data is given, the input data given can be also stored in the above described storage means by interruption processing. In addition, the above described storage means may be realized by an FIFO memory so that input data are stored in the FIFO memory in the order in which they are given and are read out of the FIFO memory in the order in which they are given.

The above described antecedent processing is for obtaining the degrees of conformity of input data to membership functions related to an input variables of the given input data by a rule and executing for each rule a predetermined operation (for example, a MIN operation) of the degrees of conformity already obtained with respect to the input variable included in an antecedent of the rule.

After antecedent processing is terminated with regard to all input variables, a predetermined operation (for example, a MAX operation) of the results of the antecedent processing is executed between rules having the same consequent.

There are various embodiments of a method of setting a plurality of rules in a memory.

In one embodiment, all input variables included in all Pules are previously included in an antecedent of each of a plurality of rules, and membership functions are related to the input variables or a code is assigned to the input variable to which no membership function is related. In this case, it is determined in antecedent processing with regard to each of the input variables whether or not a membership function is related to the input variable for each rule, to find, with respect to an input variable to which a membership function is related, the degree of conformity of input data concerning the input variable to the membership function related.

In another embodiment, pairs of input variables and membership functions constituting antecedents of a plurality of rules are previously set for each input variable and in connection with identification codes of the rules.

In still another embodiment, pairs of input variables and membership functions constituting antecedents of a plurality of rules are previously set for each input variable in conformity to a code indicating an input variable and in connection with identification codes of the rules. Input data is given with a code indicating an input variable of the input data being added thereto. The code indicating the input variable added to the input data given is determined, and antecedent processing is performed with regard to pairs of an input variable and membership functions set in conformity to the determined code indicating an input variable.

According to the present invention, when input data is given or by reading out input data which has been already given and stored in storage means, antecedent processing is performed with regard to all rules to which an input variable of the input data is related. When the antecedent processing is terminated, antecedent processing is performed with regard to all rules to which an input variable of another input data is related.

In such a manner, antecedent processing is executed for each input variable.

According to the present invention, antecedent processing in fuzzy reasoning operation processing is executed for each input variable. Accordingly, in a case where input data are sequentially transferred, if the transfer of one input data is terminated, antecedent processing can be executed with regard to the input data already transferred while the succeeding input data is transferred. Consequently, it is not necessary to wait until the transfer of all input data is terminated, thereby to make it possible to releave transfer overhead.

Furthermore, when input data are not periodically produced, processing can start with processing with regard to data already inputted, thereby to make it possible to effectively utilize the waiting time of data.

Additionally, in a case where a time period elapsed from the time point where input data is requested until the input data requested is actually obtained differs depending on the type of input data (input variable) or is not fixed, or in a case where the order in which input data are produced is not fixed, input data is given with a code indicating an input variable of the input data being added thereto, thereby to make it possible to transfer input data and execute reasoning processing in the order in which input data are obtained.

In the above described manner, according to the present invention, it is possible to efficiently perform the entire fuzzy reasoning processing.

A fuzzy reasoning processing method according to the present invention comprises the steps of previously setting in a memory the relationship between pairs of input variables and membership functions constituting antecedents of a plurality of rules and rule numbers for each input variable, and executing antecedent processing for each input variable in such a manner as to perform antecedent processing with regard to all of the above described pairs to which such one input variable is related that input data is given and then, perform antecedent processing with regard to all of the above described pairs to which such another input variable is related that input data is given.

A fuzzy reasoning processor according to the present invention comprises a memory in which the relationship between pairs of input variables and membership functions constituting antecedents of a plurality of rules and rule numbers is previously set for each input variable, antecedent processing means for executing antecedent processing with regard to all of the above described pairs to which an input variable of input data given is related, and means for carrying out such control as to give, after antecedent processing is terminated with regard to one input variable by the above described antecedent processing means, input data concerning another input variable to the above described antecedent processing means and execute antecedent processing with regard to the another input variable.

In one embodiment of the setting of rules according to the present invention, pairs of input variables and membership functions are previously assigned a predetermined order, and a rule number area storing rule numbers respectively related to the pairs at addresses following the order is provided in the above described memory.

In another embodiment of the setting of rules according to the present invention, a number-of-rules area previously storing the number of rules including each of pairs of input variables and membership functions is provided in the above described memory, and the above described rule number area is accessed while referring to the above described number-of-rules area in antecedent processing with regard to an input variable of input data given.

In the above described number-of-rules area, the number of rules including each of pairs created by all combinations of input variables and membership functions is stored at each of addresses following a predetermined order previously assigned to the pairs.

In one embodiment of the start of antecedent processing according to the present invention, when input data is given, antecedent processing is executed with regard to all rules related to an input variable of the given input data.

In another embodiment of the present invention, input data given is temporarily stored in storage means. Input data stored in the above described storage means are sequentially read out, and antecedent processing is executed with regard to all rules related to an input variable of the input data read out.

When input data is given, the input data given can be also stored in the above described storage means by interruption processing. In addition, the above described storage means may be realized by an FIFO memory so that input data are stored in the FIFO memory in the order in which they are given and are read out of the FIFO memory in the order in which they are given.

The above described antecedent processing is for obtaining the degrees of conformity of input data to membership functions which constitute pairs along with input variables and executing for each rule a predetermined operation (for example, an MIN operation) of the degrees of conformity already obtained with respect to the input variable included in an antecedent of the rule.

After antecedent processing is terminated with regard to all input variables, a predetermined operation (for example, a MAX operation) of the results of the antecedent processing is executed between rules having the same consequent.

It is also possible to give input data with a code indicating an input variable of the input data being added thereto, determine the code, and perform antecedent processing with regard to the input variable indicated by the code. In such a manner, input data can be given in an arbitrary order.

A rule setting method according to the present invention comprises the steps of previously assigning a predetermined order to pairs created by all combinations of input variables and membership functions, storing the number of rules actually including in their antecedents each of the above described pairs created by all combinations in a plurality of rules set at each of addresses following the above described order in a number-of-rules area in a memory with respect to the above described pairs, and storing a rule number of a rule actually including each of the above described pairs actually included in the plurality of rules set at each of addresses following the above described order in a rule number area in the memory with respect to the above described pairs.

Furthermore, the rule setting method according to the present invention comprises the steps of previously assigning a predetermined order to pairs of input variables and membership functions included in antecedents of a plurality of rules set, and storing a rule number of a rule including each of the above described pairs at each of addresses following the above described order in a memory.

A rule setting apparatus according to the present invention comprises a memory storing rules set, the memory being provided with a number-of-rules area and a rule number area. Pairs created by all combinations of input variables and membership functions usable in the rules are previously assigned a predetermined order. The number of rules actually including in their antecedents each of the above described pairs created by all combinations in a plurality of rules set is stored at each of addresses following the above described order in the number-of-rules area in the memory with respect to the above described pairs, and a rule number of a rule actually including each of the above described pairs actually included in the plurality of rules set is stored at each of addresses following the above described order in the rule number area in the memory with respect to the above described pairs.

The rule setting apparatus according to the present invention further comprises a memory storing rules set. Pairs of input variables and membership functions included in antecedents of a plurality of rules set are previously assigned a predetermined order, and a rule number of a rule including each of the above described pairs is stored at each of addresses following the above described order in the above described memory.

Pairs created by all combinations of input variables and membership functions are previously assigned a predetermined order.

In a plurality of rules set, the number of rules actually including in their antecedents each of the above described pairs created by all combinations is stored at each of addresses following the above described order in a number-of-rules area in a memory with respect to the above described pairs.

A rule number of a rule actually including each of the above described pairs actually included in the plurality of rules set is stored at each of addresses following the above described order in a rule number area in the memory.

When input data is given or by reading out input data which has been already given and stored in storage means, the above described rule number area is accessed while referring to the above described number-of-rules area with respect to all the above described pairs related to an input variable of the input data, to execute antecedent processing.

Antecedent processing is executed for each input variable in such a manner as to perform antecedent processing with regard to all the above described pairs related to one input variable and then, perform antecedent processing with regard to all the above described pairs related to another input variable.

According to the present invention, antecedent processing in fuzzy reasoning operation processing is executed for each input variable. Accordingly, in a case where input data are sequentially transferred, if the transfer of one input data is terminated, antecedent processing can be executed with regard to the input data already transferred while the succeeding input data is transferred. Consequently, it is not necessary to wait until the transfer of all input data are terminated, thereby to make it possible to releave transfer overhead.

Furthermore, when input data are not periodically produced, processing can start with processing with regard to data already inputted, thereby to make it possible to effectively utilize the waiting time of data.

Additionally, when a time period elapsed from the time point where input data is requested until the input data requested is actually obtained differs depending on the type of input data (input variable) and is not fixed, or when the order in which input data are produced is not fixed, input data is given with a code indicating an input variable of the input data being added thereto, thereby to make it possible to transfer input data and execute reasoning processing in the order in which input data are obtained.

In the above described manner, according to the present invention, it is possible to efficiently perform the entire fuzzy reasoning processing.

Additionally, according to the present invention, data describing all rules by the minimum information is stored in a memory. Accordingly, it is possible to minimize the capacity of the memory storing the rules and the capacity of a data temporary storage area used during an operation. In addition, unnecessary processing is skipped, thereby to make it possible to reduce time required to execute reasoning processing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates the arrangement of rule data stored in the RAM;

FIG. 8 illustrates the arrangement of rule data in a second embodiment;

FIG. 11 is a block diagram illustrating the construction of a fuzzy reasoning processor according to a third embodiment;

FIG. 12 illustrates a format of input data accompanied by an input variable number;

FIG. 13 illustrates a process completion flag area;

FIG. 14 illustrates the arrangement of rule data stored in a RAM;

FIG. 28 illustrates a number-of-rules area;

FIG. 29 illustrates a rule number area;

DESCRIPTION OF THE PREFERRED EMBODIMENTS

First Embodiment

FIGS. 1 to 5 illustrate a first embodiment.

Figure 1:
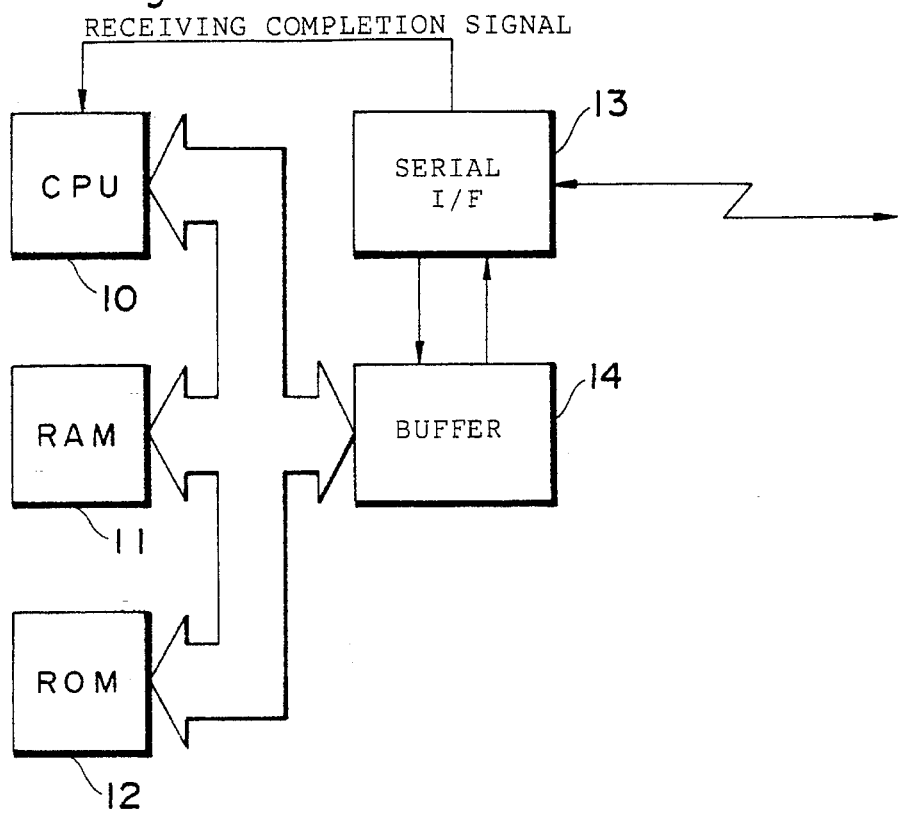
FIG. 1 is a block diagram illustrating the construction of a fuzzy reasoning processor according to a first embodiment.

FIG. 1 illustrates the construction of a fuzzy reasoning processor. The fuzzy reasoning processor executes fuzzy reasoning processing in accordance with software. It goes without saying that the fuzzy reasoning processor according to the present invention includes not only a general purpose processor so programmed as to allow fuzzy reasoning processing but also a processor having architecture dedicated to fuzzy reasoning processing.

In the present embodiment, input data is given to the fuzzy reasoning processor from external equipments or apparatuses (a host CPU and the like) through a serial transmission line. The order in which input data are given is previously determined as described later.

The fuzzy reasoning processor comprises a CPU 10 for performing fuzzy reasoning processing, data transmission control and the like. A RAM 11, a ROM 12 and a buffer (memory) 14 are connected to the CPU 10 through various buses.

The fuzzy reasoning processor is provided with a serial transmission interface 13 so as to receive input data. The interface 13 is connected to the serial transmission line. When the interface 13 receives input data in one unit concerning one input variable, a signal indicating the completion of the receiving of input data (receiving completion signal) is given to the CPU 10 from the interface 13. The input data received is temporarily stored in the buffer 14.

A plurality of rules, a plurality of membership functions and the like previously set are stored in the RAM 11. The RAM 11 is further provided with areas storing various data required for operation processing and a work area for the operation processing. The ROM 12 stores a fuzzy reasoning execution program, a data transmission control program and the like which are executed by the CPU 10.

Figure 2:
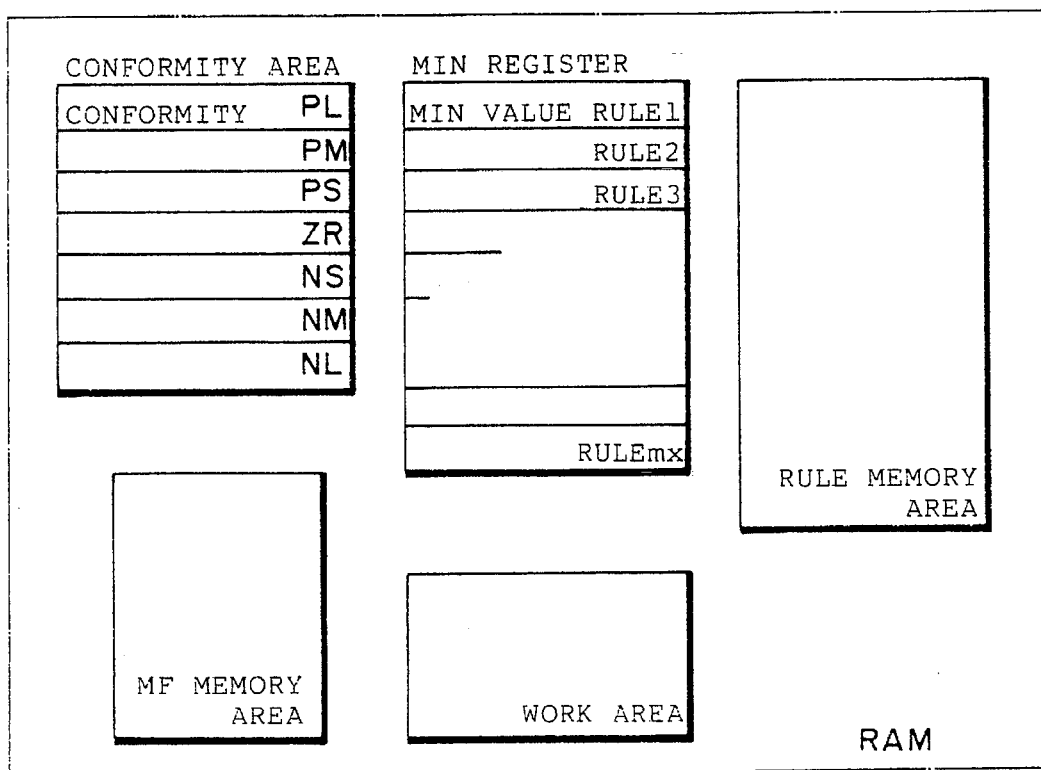
FIG. 2 illustrates the contents of a RAM.

FIG. 2 illustrates the various areas provided in the RAM 11. An area storing the degree of conformity (conformity area), an area used as MIN registers, a rule memory area storing set rules, an MF memory area storing membership functions (MFs) set, a work area and the like are provided in the RAM 11.

In the present embodiment, a maximum of seven types (labels) of membership functions shall be used with respect to one input variable. Let the labels of the membership functions be PL, PM, PS, ZR, NS, NM and NL. PL represents positive large, PM represents positive medium, PS represents positive small, ZR represents almost zero, NS represents negative small, NM represents negative medium, and NL represents negative large. The seven labels of the membership functions may be set for each input and output variables, or can be shared among some or all of the input and output variables. Data or codes representing the membership functions are stored in the MF memory area.

The conformity area is one for temporarily storing the degree of conformity of input data concerning an input variable which is being subject to antecedent processing to each of the seven labels of the membership functions (a function value or a grade obtained when the input data is applied to the membership function).

In the present embodiment, the number of rules set is expressed by mx. The MIN register stores for each rule the result of a MIN operation of the degrees of conformity obtained in antecedent processing with regard to the rule.

FIG. 3 shows an example of rules set in the rule memory area in the RAM 11. Ten rules are illustrated. x1, x2, x3 and x4 express input variables. y1 expresses an output variable. The respective numbers of input and output variables are, of course, arbitrary. In the rules, a code S is combined with input variables with which no membership function is combined.

Figure 4:
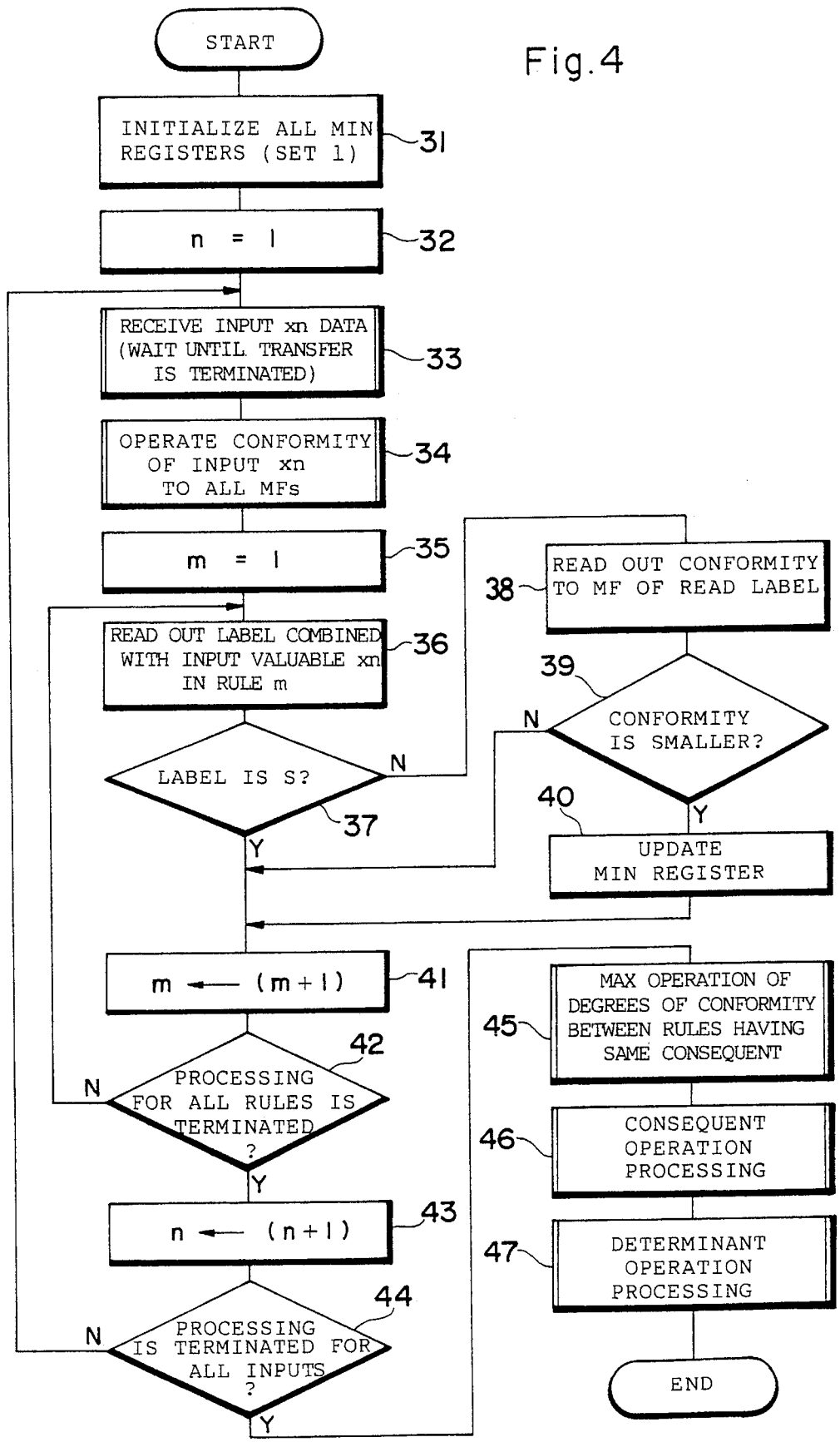
FIG. 4 is a flow chart showing the procedure of fuzzy reasoning processing according to the first embodiment.

FIG. 4 shows the procedure of fuzzy reasoning processing performed by the CPU 10. It is assumed that input data are transferred in the order of input variables x1, x2, x3 and x4.

First, all the MIN registers in the RAM 11 are initialized (step 31). In this initialization processing, the maximum value of the degrees of conformity, i.e., 1 is set in all the MIN registers.

Subsequently, a counter n indicating an input variable number is set to 1 (step 32). Input variable numbers of the input variables x1, x2, x3 and x4 shall be respectively 1, 2, 3 and 4.

The control waits until the serial transmission interface 13 receives input data concerning the first input variable x1. When the interface 13 receives the input data (the input variable of the input data is generally expressed by xn), a receiving completion signal is applied to the CPU 10 from the interface 13, and the input data received is stored in the buffer 14 (step 33).

The degrees of conformity of the input data received to all the membership functions PL to NL set with respect to the input variable of the input data are respectively obtained, and the degrees of conformity obtained are stored in the conformity area in the RAM 11 in conformity to the labels of the membership functions (step 34).

A counter m indicating a rule number is initialized to 1 (step 35).

The rule memory area is referred to, to see whether or not the label of a membership function combined with the input variable xn in the rule m is a code S (step 37). If the code S is combined with the input variable xn, the following antecedent processing need not be performed with regard to the input variable.

If the label of the membership function combined with the input variable xn in the rule m is other than the code S, that is, any one of the labels PL to NL, the degree of conformity corresponding to the label is read out of the conformity area (step 38), and it is determined whether or not the degree of conformity read out is smaller than the degree of conformity set in the MIN register for the rule m (a MIN operation) (step 39). In the case of the first input variable x1, the MIN register is initialized by setting the maximum value, i.e., 1 as described above. Accordingly, if the degree of conformity read out is other than 1, the answer to the determination in the step 39 is always in the affirmative. If the answer is in the affirmative in the step 39, the degree of conformity read out of the conformity area is stored in the MIN register, to update the content of the MIN register (step 40). In the above described manner, for each execution of processing with regard to each input variable, the MIN operation of the degrees of conformity for a rule to which the input variable is related is executed, to find the minimum value of the degrees of conformity in the rule.

The counter m indicating a rule number is incremented by one, so that the above described antecedent processing in the steps 36 to 40 is repeated for each rule (steps 41 and 42).

When the value in the above described counter m becomes (mx+1), the above described antecedent processing is terminated with regard to all the rules, so that the counter n indicating an input variable number is incremented by one, to indicate the succeeding input variable (step 43). The control waits until input data concerning the succeeding input variable is received (step 44).

Figure 5:
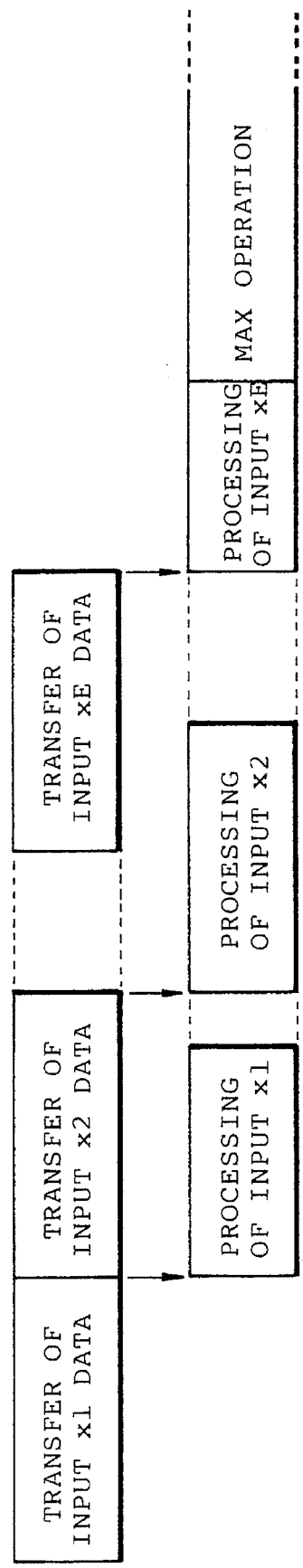
FIG. 5 illustrates the flow of processing according to the first embodiment.

In the above described manner, every time input data is received, antecedent processing is performed with regard to an input variable of the input data received. Accordingly, it is possible to perform antecedent processing with regard to the preceding input data having been received during the transfer of the succeeding input data, as shown in FIG. 5. Even when it takes long to transfer data, therefore, it is possible to reduce the waiting time to improve the entire processing efficiency. In FIG. 5, input xE data means the last input data, which corresponds to input data concerning the input variable x4 in the present embodiment.

When antecedent processing is terminated with regard to the last input variable x4 (step 44), a check is made to see whether or not there exist rules having the same consequent. For example, both a rule 1 and a rule 2 shown in FIG. 3 have the same consequent, i.e., y1=PL. Both a rule 4 and a rule 5 have the same consequent, i.e., y1=PS. In addition, both a rule 6 and a rule 8 have the same consequent, i.e., y1=ZR. A MAX operation of the degrees of conformity obtained in respective rules having the same consequent is executed between the rules, and the result of the MAX operation is stored as one to be exerted on a membership function in the consequent of the rule (step 45). For example, a1 is taken as the degree of conformity obtained in antecedent processing with regard to the rule 1 (the result of the above described MIN operation, that is, the degree of conformity stored in the MIN register), and a2 is taken as the degree of conformity obtained in antecedent processing with regard to the rule 2. The MAX operation of the degrees of conformity a1 and a2 is executed. As a result, the larger one of the degrees of conformity a1 and a2 is stored as one to be exerted on the membership function PL in the consequent.

When the degree of conformity to be exerted on a membership function in a consequent (the result of the above described MAX operation, or the degree of conformity for each rule in a case where there exist no rules having the same consequent) is obtained in the above described manner, the degree of conformity is exerted on a membership function in a corresponding consequent (a MIN operation or truncation). A MAX operation between the membership functions thus obtained is executed. This is consequent operation processing (step 46).

Finally, determinant output data concerning an output variable is obtained by executing defuzzify processing with regard to the result of the consequent operation processing (step 47). This output data is transmitted to other equipment or apparatuses from the serial transmission interface 13.

In the above described embodiment, the conformity area is provided in the RAM 11. When input data is received, the degrees of conformity of the input data to all the membership functions PL to NL set with respect to an input variable of the input data are respectively obtained, and the degrees of conformity obtained are stored in the conformity area in the RAM 11 in conformity to the labels of the membership functions.

Figure 6:
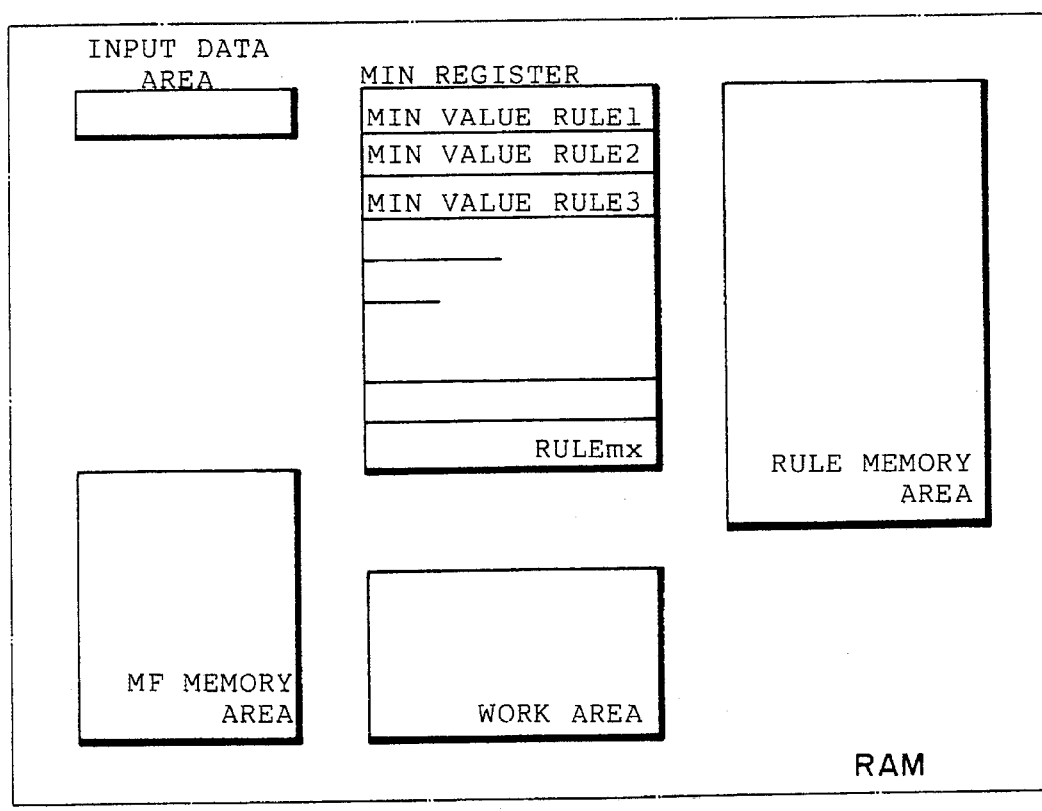
FIG. 6 illustrates the contents of a RAM in a modified embodiment.
Figure 7:
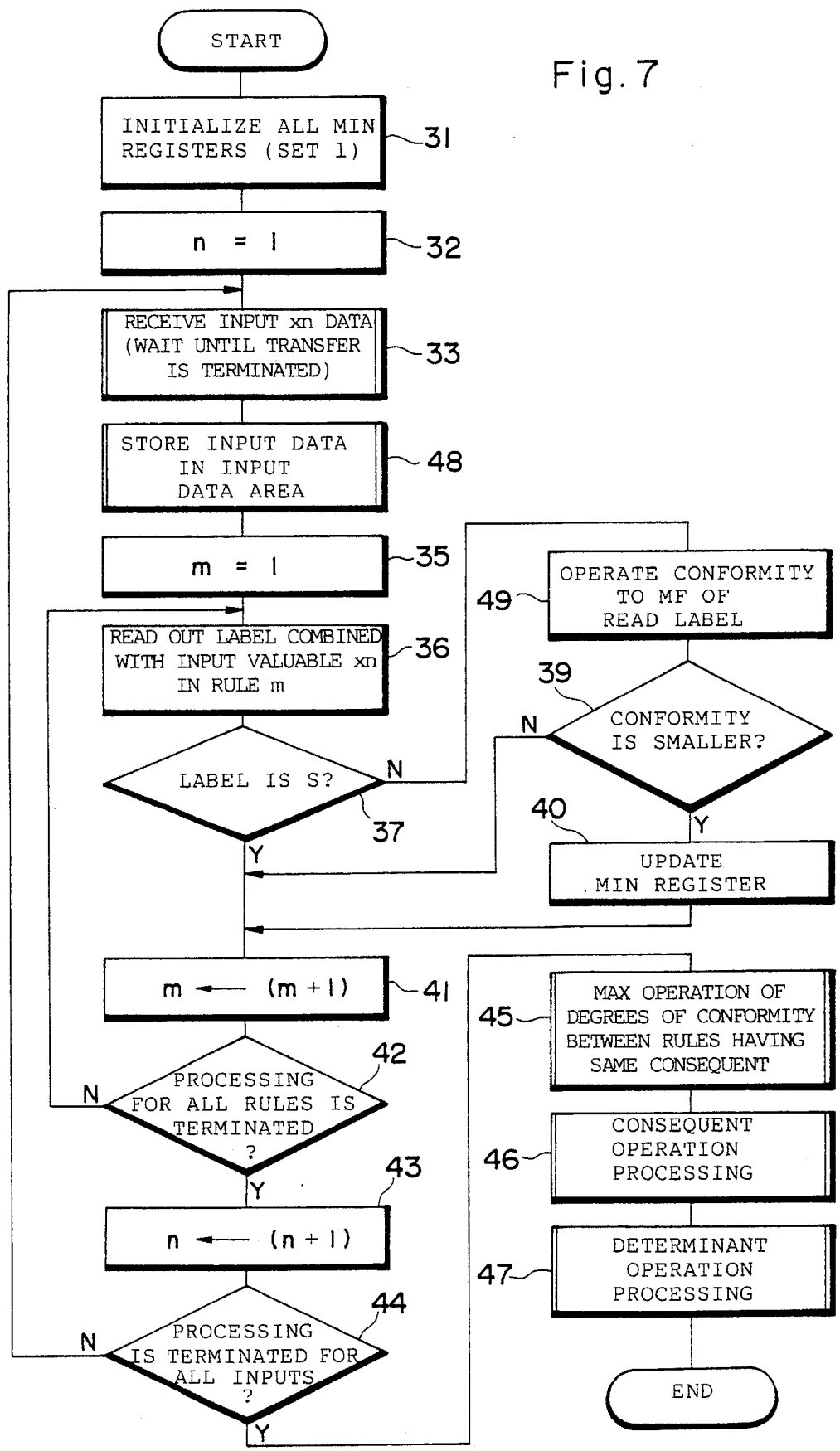
FIG. 7 is a flow chart showing the procedure of fuzzy reasoning processing in the modified embodiment.

Since the conformity area storing the degrees of conformity of input data to all the membership functions PL to NL is provided in the RAM 11, an available memory area in the RAM 11 becomes the narrower. When it is desired to utilize the memory area in the RAM 11 more effectively, an input data area is provided in place of the conformity area, as shown in FIG. 6. As shown in FIG. 7, when input data is received, the input data received is temporarily stored in the input data area in the RAM 11 (step 48). With regard to only a rule in which a label of a membership function other than a code S is combined with an input variable xn of the input data received, the degree of conformity of the input data to the membership function having the label is operated each time (step 49), to proceed to MIN operation processing. In such a manner, it is possible to effectively utilize the memory area in the RAM 11. In FIG. 7, processing other than the above described processing is the same as that shown in FIG. 4.

Second Embodiment

Figure 9:
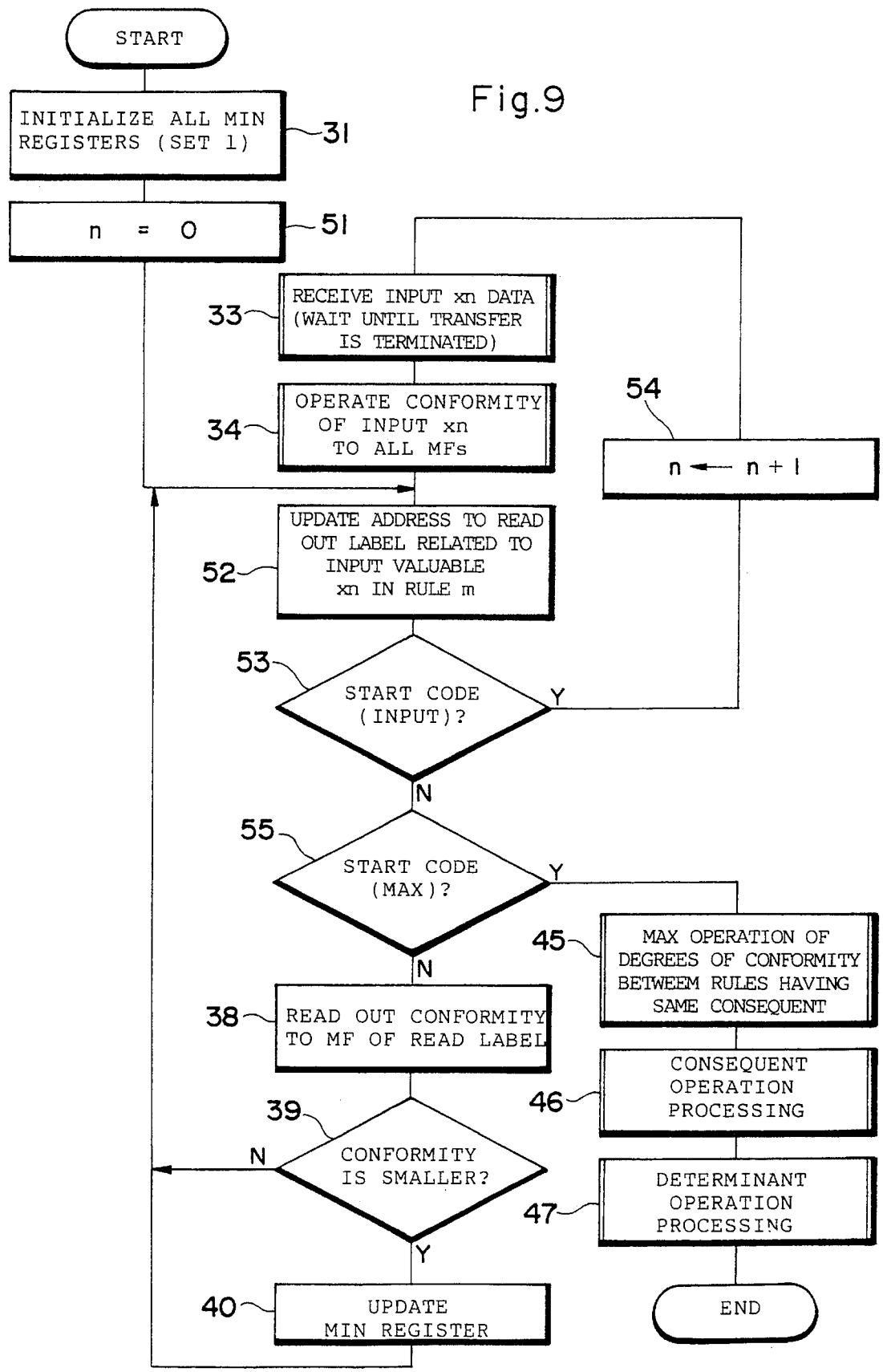
FIG. 9 is a flow chart showing the procedure of fuzzy reasoning processing according to the second embodiment.

FIGS. 8 and 9 illustrate a second embodiment.

In the above described first embodiment, all input variables are included in an antecedent of each of rules, and a special code S is combined with input variables with which no membership function is combined in place of a label of a membership function. Consequently, the description concerning input variables which are not related to each of the rules is included in the rule, thereby to increase the capacity of rule data.

In the second embodiment, a rule memory area in a RAM 11 stores for each input variable labels of membership functions related to the input variable in conformity to rule numbers, as shown in FIG. 8. A particular start code and an input variable number are set at the top of a group of labels for each input variable.

Labels of membership functions in a consequent are similarly set in a predetermined order in connection with the rule numbers with a start code and a symbol of a MAX operation at the top. The membership functions having the same label may be consecutively arranged, for example, PL (rule 1) and PL (rule 2), PS (rule 4) and PS (rule 5), and ZR (rule 6) and ZR (rule 8).

Such a method of storing rule data eliminates the necessity to execute unnecessary processing, resulting in a smaller memory capacity.

The construction shown in FIGS. 1 and 2 is also applied to the second embodiment without any modification.

FIG. 9 shows the procedure of fuzzy reasoning processing performed by a CPU 10. In FIG. 9, the same processing steps as those shown in FIG. 4 are assigned the same numbers to avoid the overlapped description.

All MIN registers are initialized (step 31) and then, a counter n indicating an input variable number is initialized to 0 (step 51). Rule data at the start of the rule memory area is read out (step 52).

It is determined whether the rule data read out is a start code:input xi (i=1 to 4) or a start code:MAX (steps 53 and 55).

If the rule data is the start code:input xi, the counter n is incremented by one (step 54), and the control waits until input data concerning an input variable which number is indicated by this counter n is received (step 33).

Since the start code:input x1 is first read out, the value set in the counter n changes from 0 to 1, to perform antecedent processing with regard to an input variable x1.

When input data concerning the input variable x1 is received, the degrees of conformity of the input data to all membership functions are calculated and are stored in a conformity area (step 34).

Rule data each consisting of a rule number and a label to which the input variable x1 is related are read out in order of addresses. Since the rule data are not a start code, the answer is in the negative in both the steps 53 and 55, so that the program proceeds to the step 38, to perform antecedent processing including a MIN operation (steps 38 to 40).

When processing is terminated with regard to all the rule data related to the input variable x1, a start code concerning the succeeding input variable x2 is read out. Accordingly, the program proceeds form the step 53 to the step 54. In the step 54, the counter n is incremented. The control waits until input data concerning the input variable x2 is received, to perform antecedent processing with regard to the input variable x2.

When antecedent processing is terminated with regard to the last input variable x4, a start code:MAX is read out. Accordingly, the answer is in the affirmative in the step 55, to perform the above described MAX operation, consequent processing and determinant operation processing (steps 45 to 47).

Figure 10:
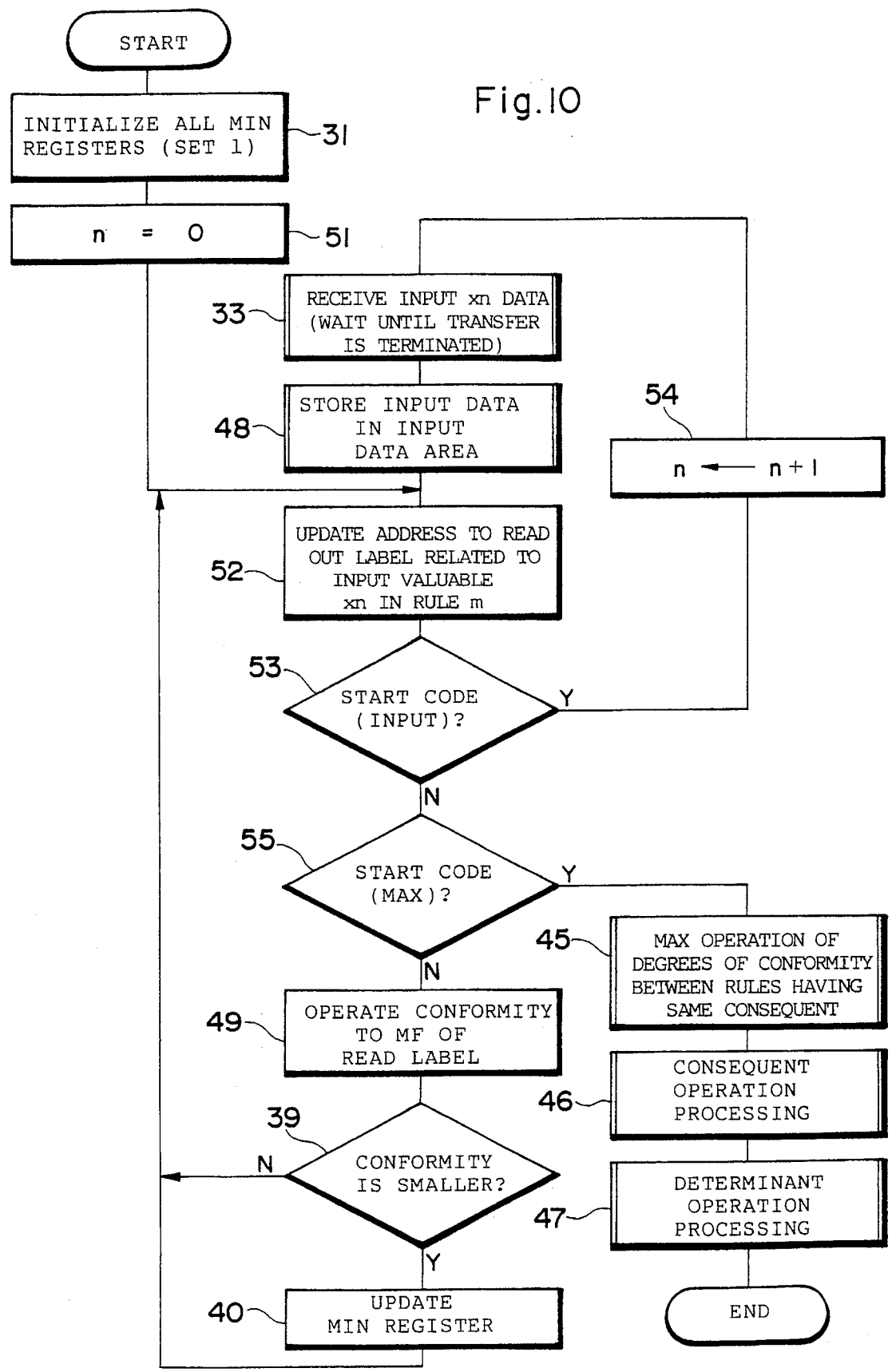
FIG. 10 is a flow chart showing the procedure of fuzzy reasoning processing in a modified embodiment.

Also in the second embodiment, an input data area may be provided in the RAM 11 in place of the conformity area, as shown in FIG. 6. As shown in FIG. 10, processing for temporarily storing received input data in the input data area (step 48) and processing for operating the degrees of conformity of the input data to membership functions combined with rules read out with respect to an input variable of the input data (step 49) can be respectively performed in place of the processing in the step 34 and the processing in the step 38 shown in FIG. 9.

Third Embodiment

FIGS. 11 to 16 illustrate a third embodiment.

In the above described first and second embodiments, it is assumed that input data are transferred in a predetermined order of input variables.

In the third embodiment, input data can be transferred in an arbitrary order.

As shown in FIG. 12, input data is transmitted in such a form that it is accompanied by an input variable number designating an input variable of the input data. For example, the input data is composed of eight bits, and the input variable number is composed of eight bits.

The construction of a fuzzy reasoning processor shown in FIG. 11 is the same as that shown in FIG. 1 except for the following.

A buffer is divided into a receiving buffer 23 and a transmission buffer 24 as illustrated. The receiving buffer 23 comprises an area 23a storing input data and an area 23b Storing an input variable number.

There are provided two RAMs 21 and 22. It goes without saying that the RAMs can be constituted by one RAM chip or not less than three RAM chips.

At least rule data as shown in FIG. 14 are stored in one of the RAMs 22. At least a work area is provided in the other RAM 21. The above described conformity area, MIN registers and MF memory area, and an area storing a flag indicating process completion (process completion flag area) shown in FIG. 13 may be provided in either one of the RAMs.

A rule memory area in the RAM 22 previously stores for each input variable number (input x1, input x2 or the like) rule data each consisting of a rule number to which an input variable specified by the input variable number and a label of a membership function combined with the input variable in a rule specified by the rule number, as shown in FIG. 14. A group of rule data for each input variable can be accessed by an input variable number of the input variable. An end code END is set at the end of the group of rule data.

By an input variable number stored in the input variable number area 23b in the receiving buffer 23, an area, in the RAM 22, storing a group of rule data corresponding to an input variable specified by the input variable number is addressed. More specifically, by an input variable number, an area storing a group of rule data related to an input variable specified by the input variable number may be designated in its upper address bits. In this case, each rule data (a rule number and a label) is designated in its lower address bits.

The process completion flag area shown in FIG. 13 stores a flag indicating process completion (process completion flag) in conformity to an input variable. The process completion flag is initially reset to 0, and is set to 1 when antecedent processing is terminated with regard to the input variable. When it is confirmed that process completion flags are set to 1 in conformity to all input variables, the program proceeds to a MAX operation of the degrees of conformity between rules having the same consequent (step 45 in FIG. 15).

Figure 15:
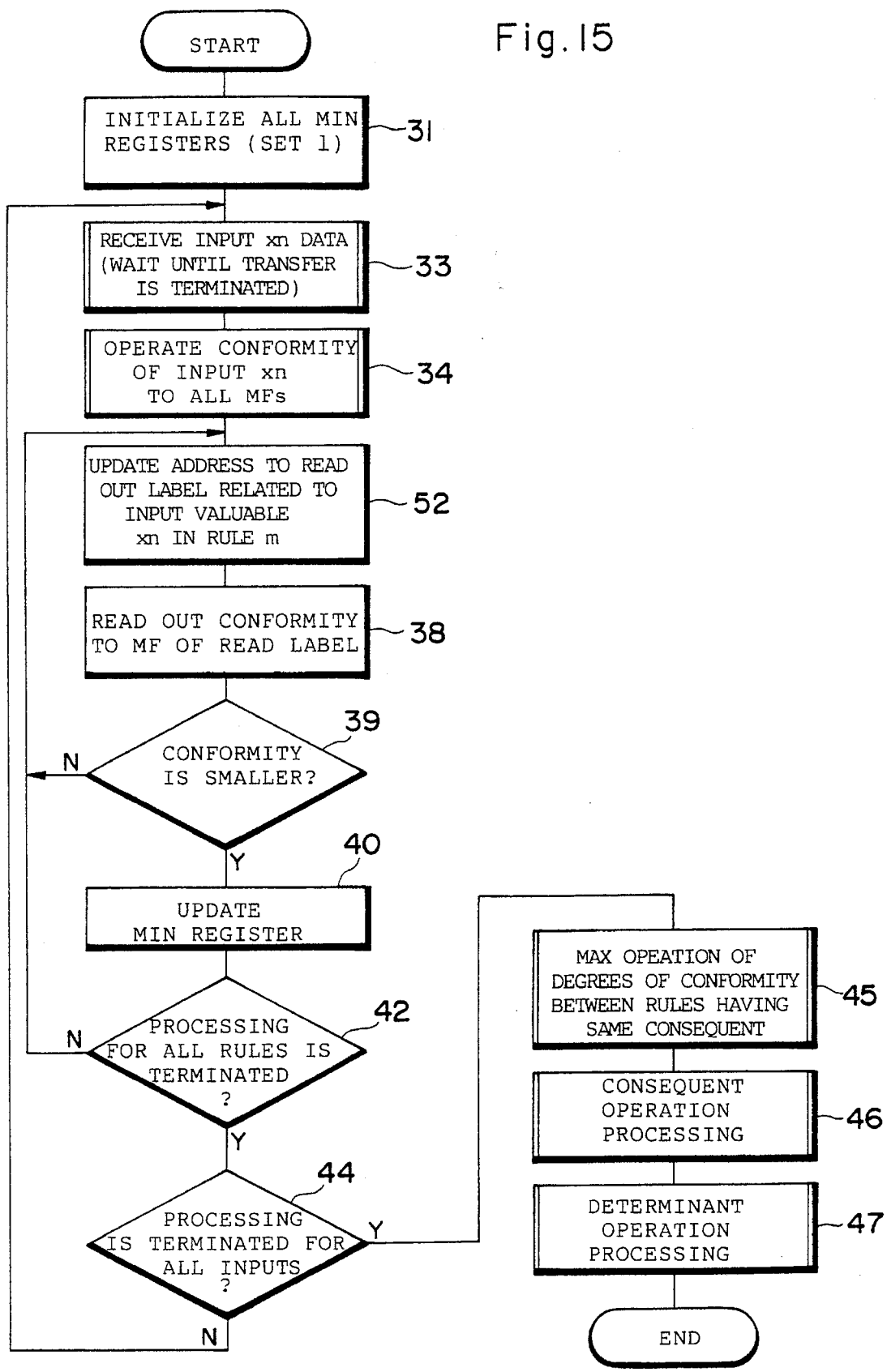
FIG. 15 illustrates the procedure of fuzzy reasoning processing according to the third embodiment.

FIG. 15 shows the procedure of fuzzy reasoning processing executed by a CPU 10. Also in FIG. 15, the same processing steps as those shown in FIGS. 4 and 9 are assigned the same numbers.

When input data, along with an input variable number added thereto, is received, the degrees of conformity of the input data to membership functions related to the input variable number are obtained, and the degrees of conformity obtained are stored in the conformity area (steps 33 and 34).

Next, rule data are sequentially read out of an area, in the RAM 22, designated in its upper address bits by an input variable number received, and the degree of conformity is read out and MIN operation processing is executed with respect to each of the rule data (step 52, and steps 38 to 40). If an end code END is read out, antecedent processing is terminated with regard to an input variable specified by the input variable number, so that a corresponding process completion flag is set to 1 (step 42).

The control waits until the succeeding input data is received, to similarly perform antecedent processing with regard to an input variable specified by an input variable number added to the input data.

If process completion flags corresponding to all input variables are set to 1 (step 44), a MAX operation, consequent processing and determinant operation processing are performed (steps 45 to 47).

Figure 16:
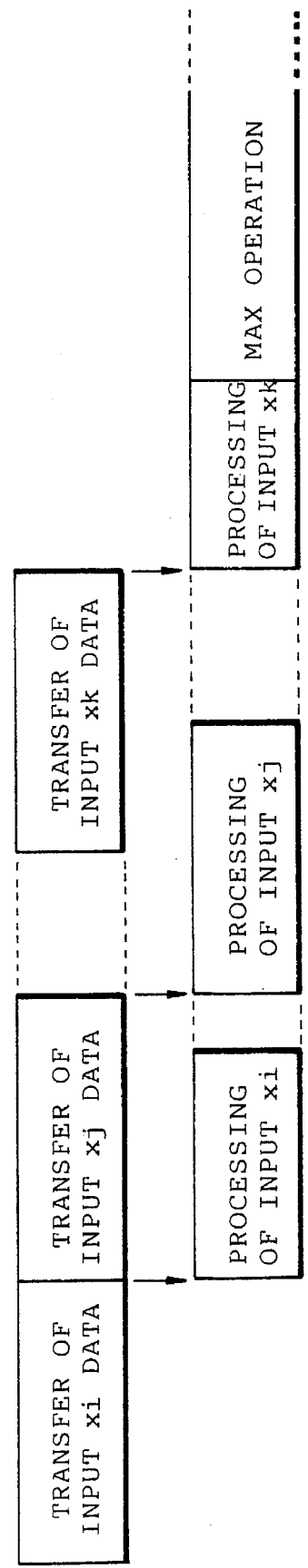
FIG. 16 illustrates the flow of processing according to the third embodiment.

In the above described manner, even if input data are given in an arbitrary order, it is possible to execute antecedent processing with regard to the preceding input data having been already given during the transfer of the succeeding input data, as shown in FIG. 16.

Figure 17:
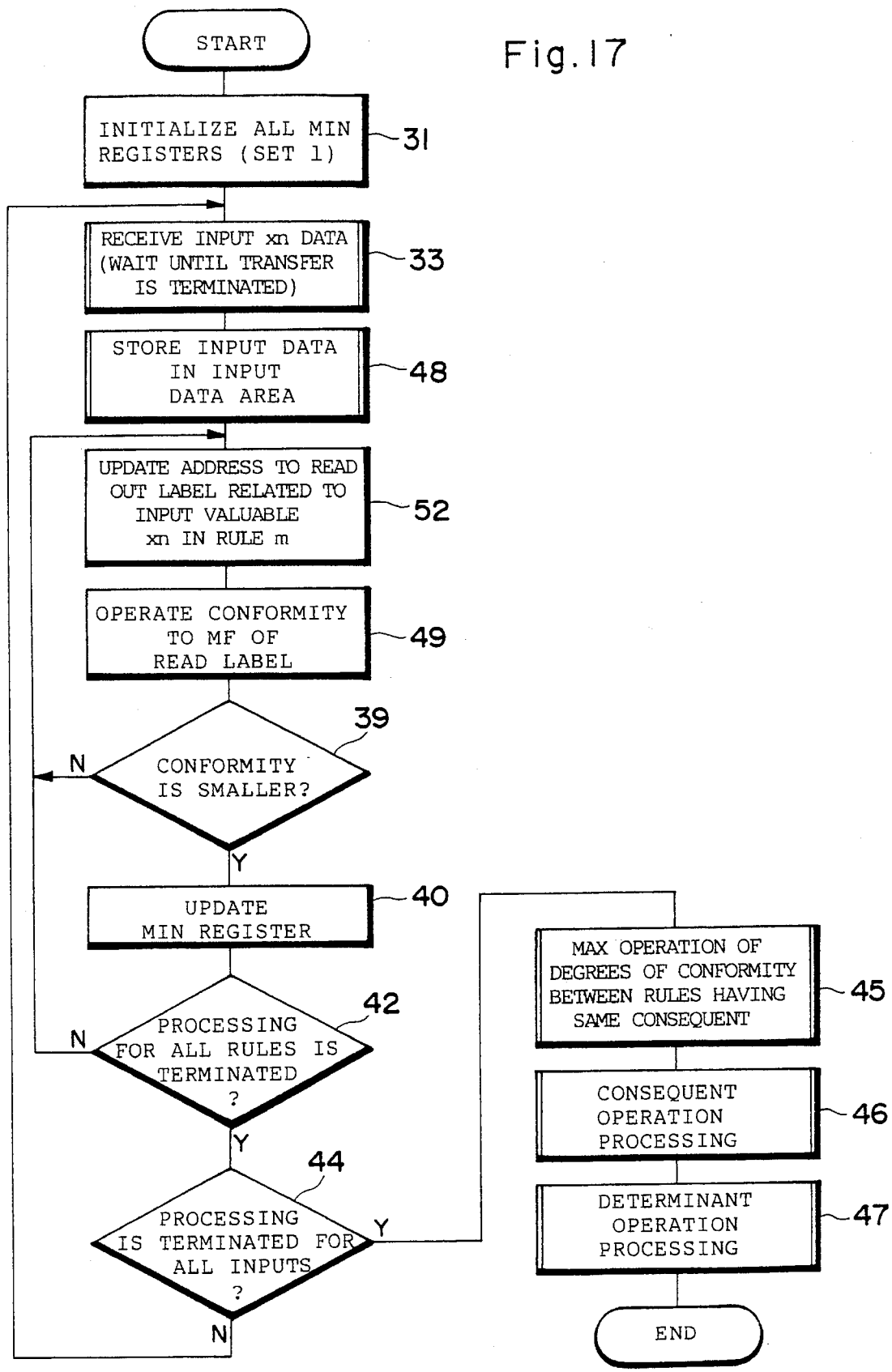
FIG. 17 is a flow chart showing the procedure of fuzzy reasoning processing in a modified embodiment.

Also in the third embodiment, it goes without saying that the processing in the step 34 and the processing in the step 38 shown in FIG. 15 can be respectively replaced with processing in the step 48 and processing in the step 49, as shown in FIG. 17.

Fourth Embodiment

In the above described first to third embodiments, it is assumed that antecedent processing with regard to input data which have been received is completed during a short time period elapsed until the transfer of input data subsequently transferred is terminated, as can be seen from FIGS. 5 and 16.

When it takes relatively long to perform antecedent processing with regard to one input variable because the number of rules is large or when the transfer rate of succeeding input data is relatively high, there occurs a situation where during the execution of antecedent processing with regard to an input variable of preceding input data having been received, the receiving of the succeeding input data is completed. Not less than two kinds of input data may, in some cases, be subsequently received during the execution of the antecedent processing with regard to the preceding input data.

The fourth embodiment relates to a fuzzy reasoning processor capable of coping with such a situation by temporarily storing input data subsequently received.

There are two methods of temporarily storing succeeding input data.

Figure 18:
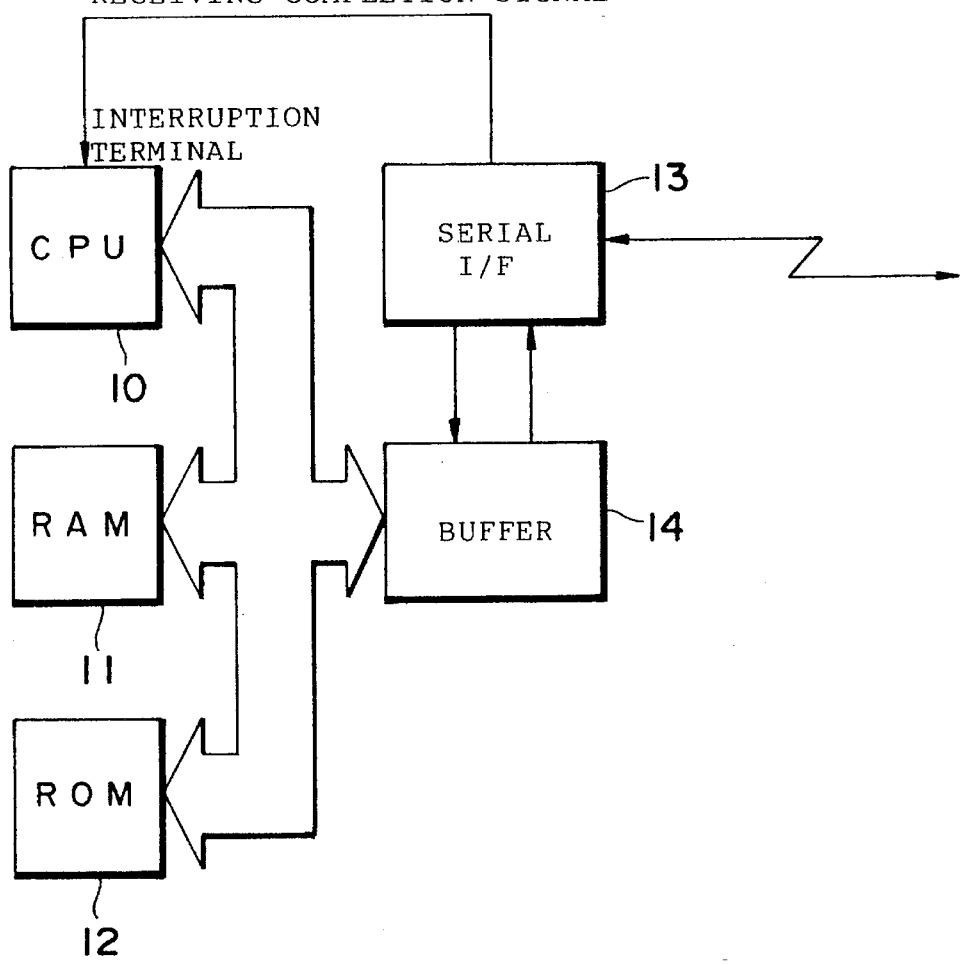
FIG. 18 is a block diagram illustrating one example of the construction of a fuzzy reasoning processor in a fourth embodiment.
Figure 19:
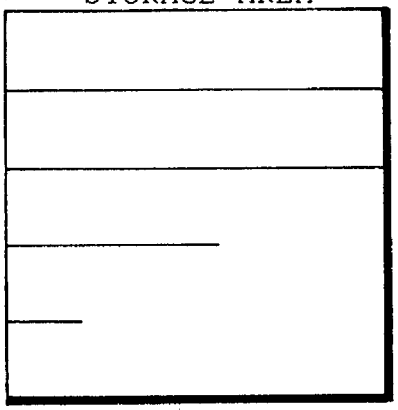
FIG. 19 illustrates an input data temporary storage area.
Figure 20:
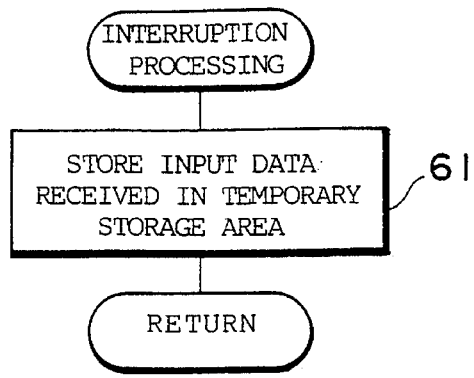
FIG. 20 is a flow chart showing the procedure of interruption processing.

One is a method of temporarily storing in a memory such as a RAM input data received by interruption processing utilizing as a trigger a receiving completion signal of the input data, and the details thereof are illustrated in FIGS. 18 to 20.

A fuzzy reasoning processor shown in FIG. 18 is basically the same as that shown in FIG. 1. A receiving completion signal generated from a serial transmission interface 13 is applied as an interrupt signal to an interruption terminal of a CPU 10.

An input data temporary storage area capable of storing a plurality of input data as shown in FIG. 19 is provided in a RAM 11.

FIG. 20 shows the procedure of interruption processing performed by the CPU 10. If the interrupt signal is applied from the serial transmission interface 13, received input data stored in a buffer 14 (including, in some cases, an input variable number as in the third embodiment) is stored in the input data temporary storage area in the RAM 11 and then, the program is returned to the main routine.

Figure 25:
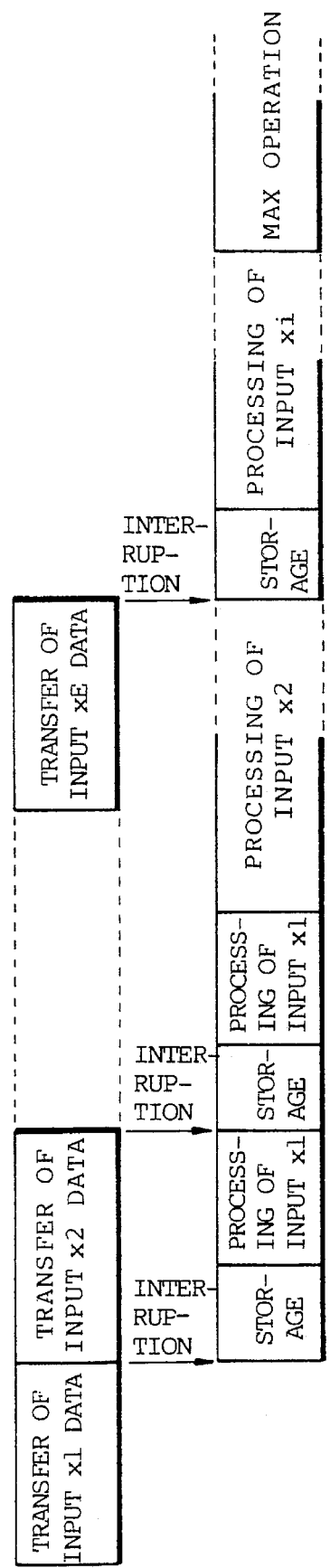
FIG. 25 illustrates one example of the flow of processing according to the fourth embodiment.

As shown in FIG. 25, after input data concerning an input variable x1 is received, antecedent processing is performed with regard to the input variable x1. When input data concerning the succeeding input variable x2 is received during the execution of the antecedent processing with regard to the input variable x1, the antecedent processing with regard to the input variable x1 is temporarily interrupted, and storage processing (interruption processing) of the received input data concerning the input variable x2 in the RAM 11 is performed. When the storage processing of the input data concerning the input variable x2 in the RAM 11 is terminated, the antecedent processing with regard to the input variable x1 is resumed again. The same is true for a case where during the execution of antecedent processing with regard to another input variable, input data concerning still another input variable is received.

Figure 21:
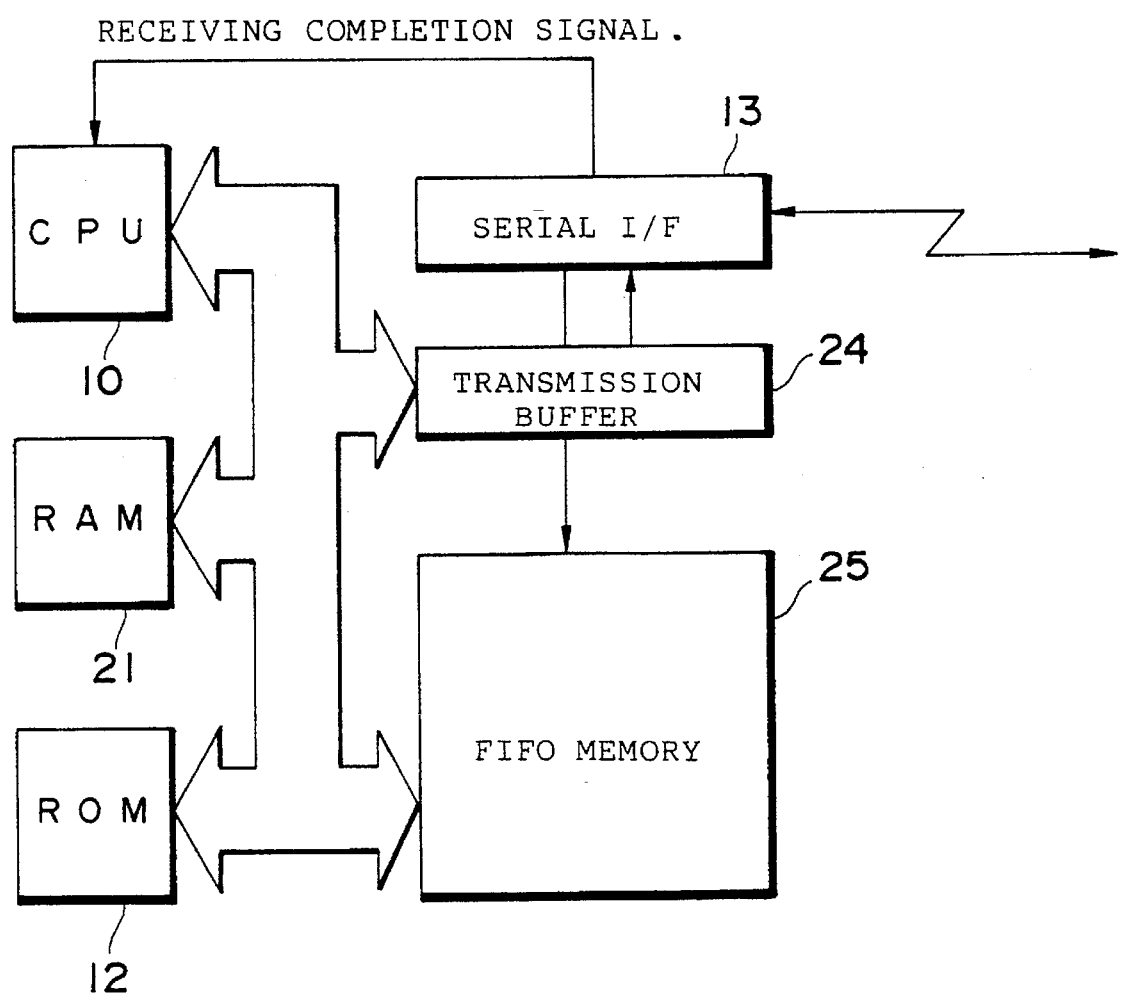
FIG. 21 is a block diagram illustrating another example of the construction of a fuzzy reasoning processor in the fourth embodiment.

The second method of temporarily storing succeeding input data is one utilizing an FIFO (First In First Out) memory. An example of the construction of a fuzzy reasoning processor comprising the FIFO memory is illustrated in FIG. 21.

Input data (including, in some cases, an input variable number added to the input data as in the third embodiment) received by the serial transmission interface 13 are stored in an FIFO memory 25 in the order in which they are received. The FIFO memory 25 is used only for temporarily storing the input data. Other data for fuzzy reasoning are stored in a RAM 21, as shown in FIG. 2. The other construction is the same as that shown in FIG. 11.

As described later, the CPU 10 refers to the FIFO memory 25 every time antecedent processing is terminated with regard to each input variable, to check to see whether or not input data to be subsequently processed is temporarily stored in the memory 25. If input data are stored, the input data are read out of the memory 25 in the order in which they are received, to perform antecedent processing with regard to the read input data. On the other hand, if no input data is stored, the control waits until input data is received.

Figure 26:
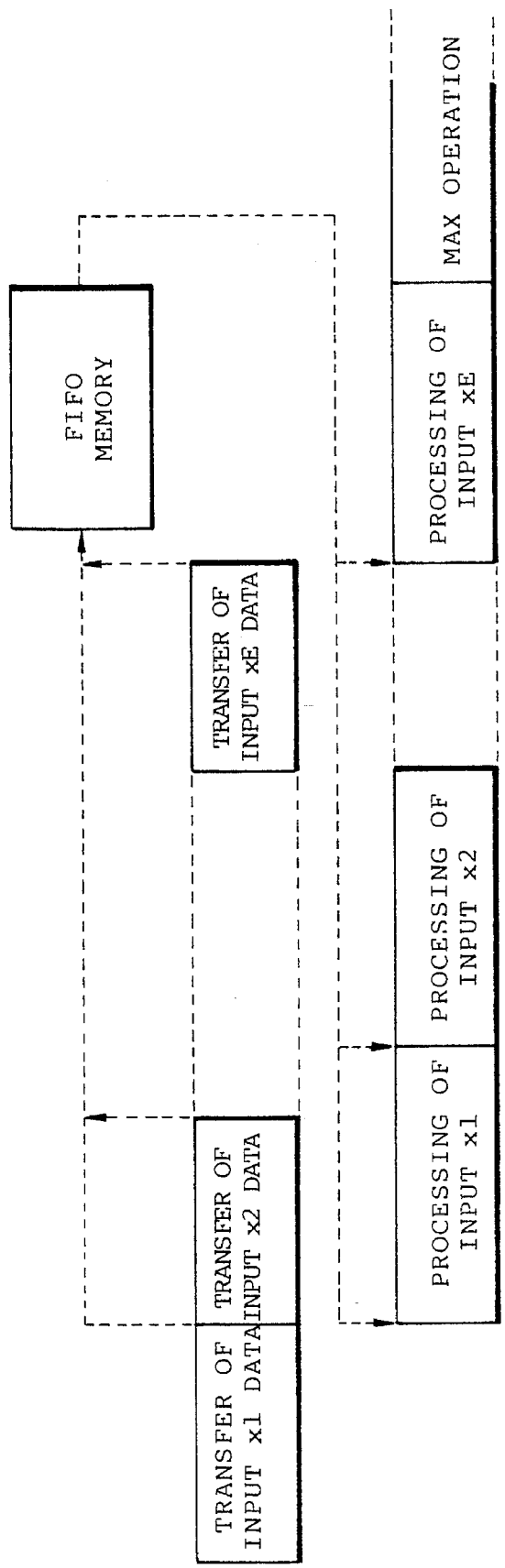
FIG. 26 illustrates another example of the flow of processing according to the fourth embodiment.

As shown in FIG. 26, after input data concerning the first input variable x1 is received, antecedent processing for each input variable is successively performed so long as input data to be subsequently processed exists in the FIFO memory 25.

Figure 22:
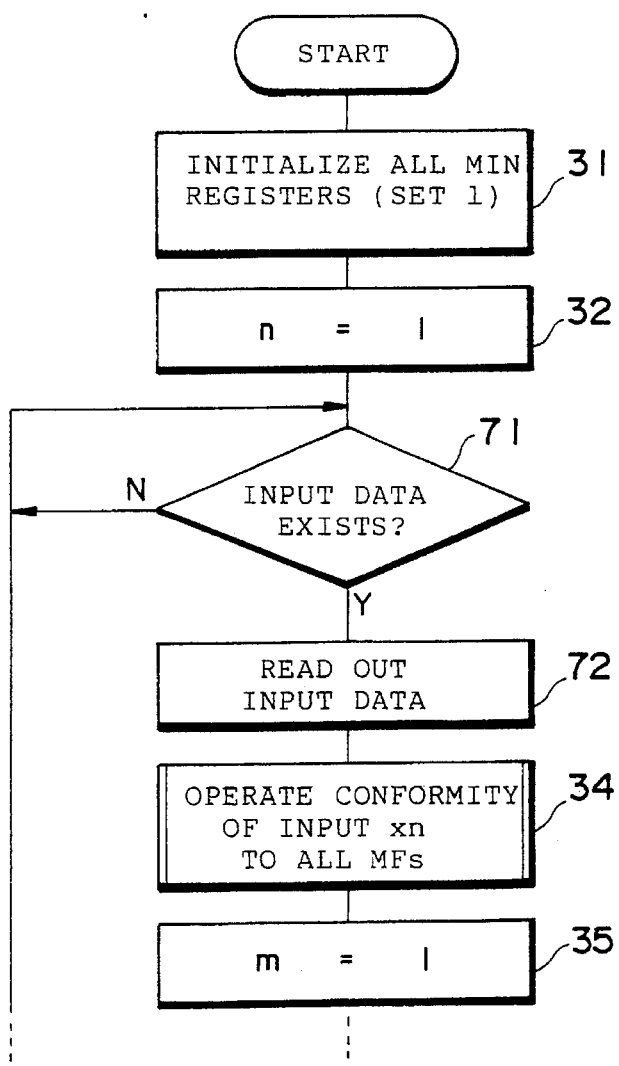
FIG. 22 is a flow chart showing the procedure of fuzzy reasoning processing in the first embodiment which is modified by the fourth embodiment.

FIG. 22 corresponds to the procedure of processing according to the first embodiment shown in FIG. 4. In starting antecedent processing with regard to the first input variable x1 and every time antecedent processing is terminated with regard to one input variable, it is determined whether or not input data exists in the RAM 11 or the FIFO memory 25 (step 71). If input data exists, the input data is read out, to perform antecedent processing with regard to an input variable of the read input data (step 72 and subsequent steps). The other processing is the same as that shown in FIG. 4.

Figure 23:
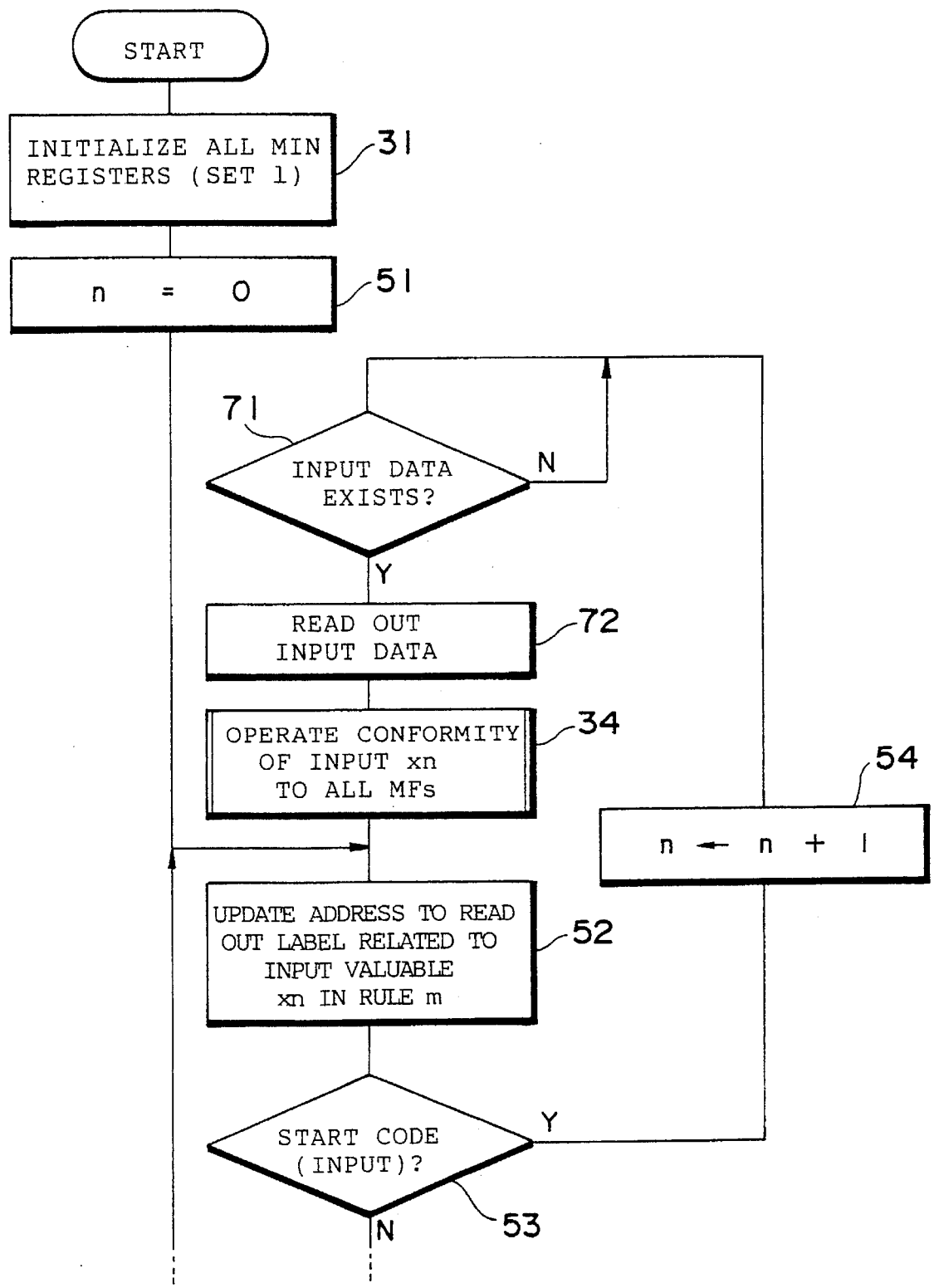
FIG. 23 is a flow chart showing the procedure of fuzzy reasoning processing in the second embodiment which is modified by the fourth embodiment.

FIG. 23 corresponds to the procedure of processing according to the second embodiment shown in FIG. 9. When rule data read out of the RAM 11 indicates a start code:input xi (step 53), a counter n indicating an input variable number is incremented (step 54), and it is determined whether or not input data exists in the RAM 11 or the FIFO memory 25 (step 71). If input data exists, the input data is read out, to perform antecedent processing with regard to an input variable of the read input data (step 72 and subsequent steps). The other processing is the same as that shown in FIG. 9.

Figure 24:
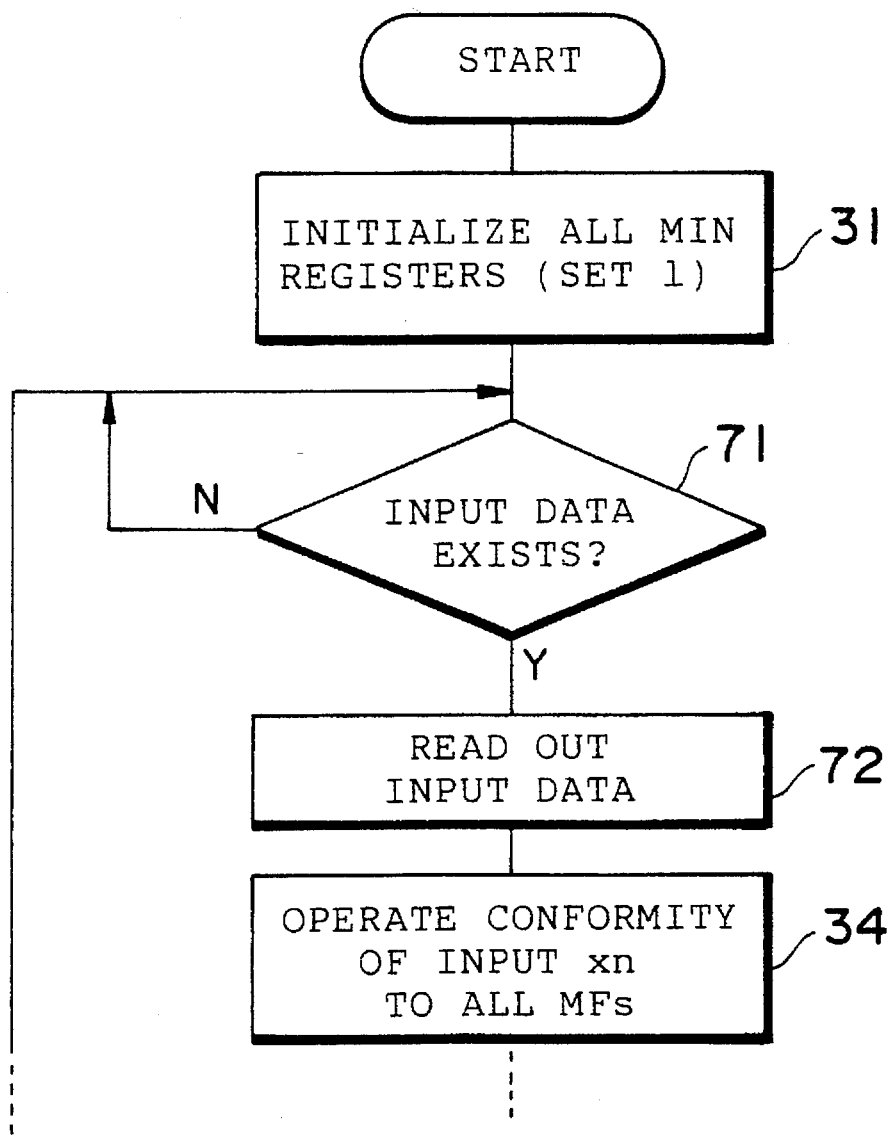
FIG. 24 is a flow chart showing the procedure of fuzzy reasoning processing in the third embodiment which is modified by the fourth embodiment.

FIG. 24 corresponds to the procedure of processing according to the third embodiment shown in FIG. 15. In starting antecedent processing with regard to the first input variable and every time antecedent processing is terminated with regard to one input variable, it is determined whether or not input data accompanied by an input variable number exists in the RAM 11 or the FIFO memory 25 (step 51). If input data exists, the input data and the input variable number are read out, to perform antecedent processing with regard to an input variable specified by the input variable number read out using the input data read out (step 72 and subsequent steps). The other processing is the same as that shown in FIG. 15.

It goes without saying that also in the processing shown in FIGS. 22, 23 and 24, the degrees of conformity of input data to membership functions involved in only set rules may be obtained prior to MIN operation processing in place of the step 34 of obtaining the degrees of conformity of input data to all membership functions (step 49 in FIGS. 7, 10 and 17).

In the above described manner, it is possible to asynchronously receive input data as well as perform antecedent processing with regard to each input variable.

Fifth Embodiment

In the above described first embodiment, all input variables are included in an antecedent of each of the rules, and a special code S is combined with input variables with which no membership function is combined in place of a label of a membership function. Consequently, the description concerning input variables which are not related to each of the rules is included in the rule, thereby to increase the capacity of rule data.

Furthermore, the degrees of conformity to all membership functions are obtained and are stored in the conformity area in the RAM 11, in the step 34 shown in FIG. 4.

As in a group of rules shown in FIG. 3, seven types of membership functions PL to NL are combined with an input variable x1, five types of membership functions are combined with an input variable x2, and only four types of membership functions are respectively combined with input variables x3 and x4. Nevertheless, in the above described first embodiemnt, the degrees of conformity to all the membership functions are obtained. Accordingly, an unnecessary operation is executed, and the locations for storing the degrees of conformity to the seven types of membership functions are inevitably required in the conformity area.

The fifth embodiment aims at making the capacity of a rule memory area and the capacity of a conformity area as small as possible as well as omitting a useless operation of the degrees of conformity.

In the fifth embodiment, the construction of the fuzzy reasoning processor shown in FIG. 1 is applied without any modification. In addition, the contents of the RAM 11 shown in FIG. 2 in the first embodiment are applied without any modification except that the capacity for storing the degree of conformity to one membership function is sufficient for the capacity of the conformity area in the fifth embodiment and except that the contents of the rule memory area differ from that shown in FIG. 2. The flow of fuzzy reasoning processing shown in FIG. 5 can be utilized without any modification.

Figure 27:
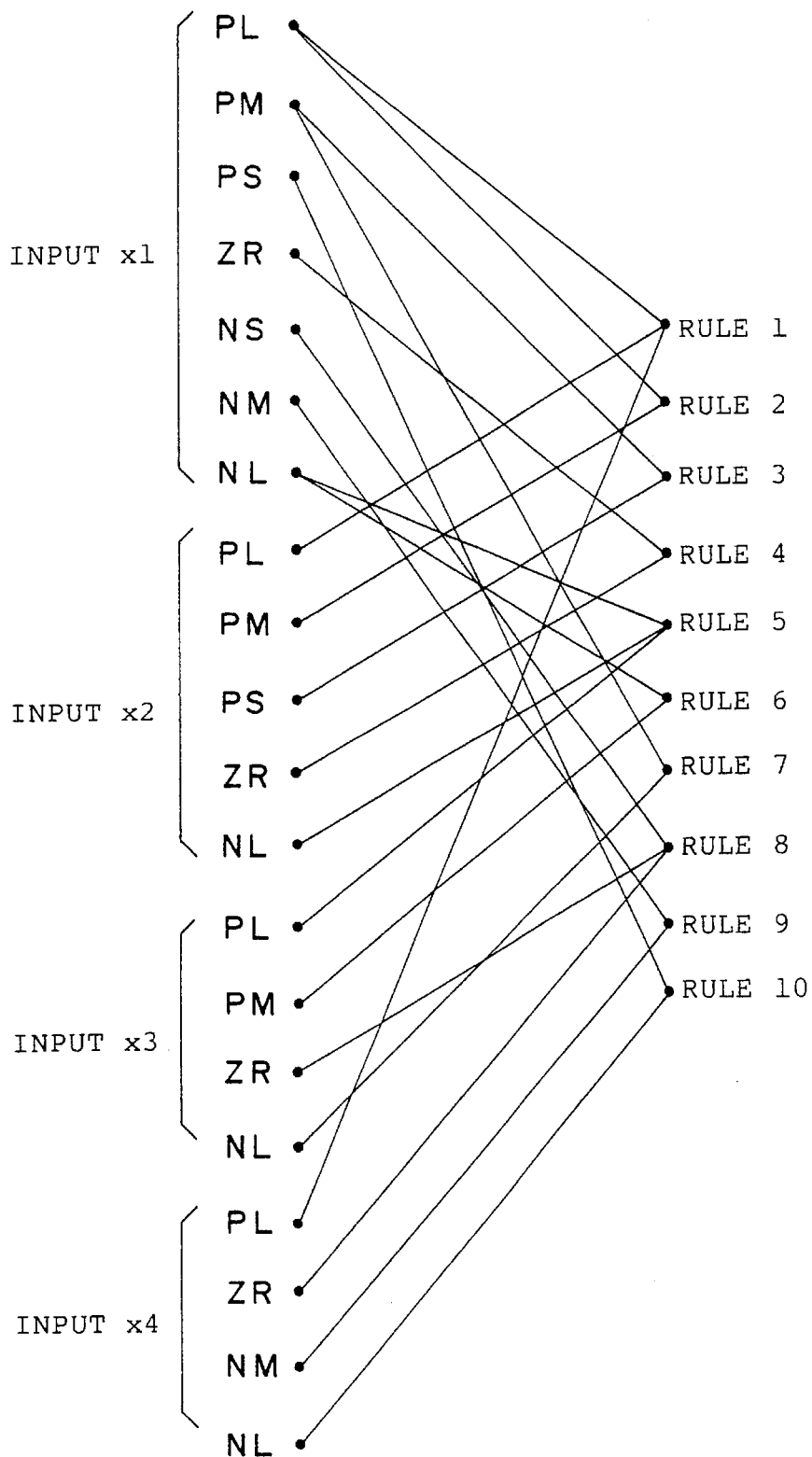
FIG. 27 is a diagram showing the relationship between pairs of input variables and labels and rule numbers in a fifth embodiment.

FIG. 27 shows the relationship between pairs of input variables and labels (pair of x1-PL, pair of x1-PM and the like) with regard to ten rules shown in FIG. 3. Only the description concerning the relationship shown in FIG. 27 is sufficient to describe the rules.

In the fifth embodiment, a number-of-rules area as shown in FIG. 28 and a rule number area as shown in FIG. 29 are provided in a RAM 11 so as to establish the relationship between the pairs of input variables and labels and the rules as shown in FIG. 27.

For easy illustration, ten rules shown in FIG. 3 will be described by way of example. The number of input variables is taken as four, and the number of output variables is taken as one. In addition, the number of labels is taken as seven.

The numbers of all combinations of the four types of input variables x1, x2, x3 and x4 and the seven types of labels PL, PM, PS, ZR, NS, NM and NL is 28. The 28 combinations (pairs of input variables and labels) are assigned a predetermined order. In the present embodiment, the order of the input variables is x1, x2, x3 and x4, and the order of the labels is PL, PM, PS, ZR, NS, NM and NL. The input variables shall precede the labels. Consequently, the order of the pairs is input x1-label PL, input x1-label PM, input x1-label PS, input x1-label ZR, input x1-label NS, input x1-label NM, input x1-label NL, input x2-label PL, input x2-label PM, input x2-label PS, input x2-label ZR, input x2-label NS, input x2-label NM, input x2-label NL, input x3-label PL, input x3-label PM, input x3-label PS, . . . , input x4-label NM and input x4-label NL.

In the number-of-rules area shown in FIG. 28, a storage location corresponding to one word (for example, eight bits or four bits) is assigned to such a pair of an input variable and a label with the above described order of pairs and the order of consecutive addresses coinciding with each other. A start address of the number-of-rules area is expressed by LA. Consequently, addresses corresponding to pair of x1-PL, pair of x2-PL, pair of x3-PL, and pair of x4-PL are respectively (LA+0), (LA+7), (LA+14), and (LA+21). That is, an address assigned to a storage location at the start of each of the input variables is found by adding a multiple of seven to LA.

In each of such storage locations in the number-of-rules area, the number of rules actually including in their antecedents a pair of an input variable and a label corresponding to each other is stored. For example, a pair of an input variable x1 and a label PL is included in antecedents of rules 1 and 2, respectively, so that 2 is stored as the number of rules in a storage location assigned an address LA. A pair of an input variable x1 and a label PM is included in antecedents of rules 3 and 7, respectively, so that 2 is stored as the number of rules in a storage location assigned an address (LA+1). Since a pair of an input variable x1 and a label PS is included in only an antecedent of a rule 10, 1 is stored as the number of rules in a storage location assigned an address (LA+2). Since a pair of an input variable x2 and a label NS is not included in any rule, 0 is stored as the number of rules in a storage location assigned an address (LA+11). A numeral in a parenthesis shown in FIG. 28 is the number of rules in the present embodiment.

(The number of input variables)×(the number of labels) words (4×7=28 words in the present embodiment) are sufficient for the storage capacity of the number-of-rules area.

Consecutive addresses are assigned to respective storage locations (one word=eight or four bits) in the rule number area shown in FIG. 29, and a start address is expressed by RU. A rule number of a rule including each of all pairs of input variables and labels (which may be overlapped with each other) actually included in antecedents of rules set is stored in each of storage locations in the rule number area with the above described order of pairs and the order of addresses coinciding with each other.

For example, a pair of an input variable x1 and a label PL is included in two rules (the number of rules=2) as described above, and the rules are a rule 1 and a rule 2. Consequently, 1 and 2 are respectively stored as rule numbers in storage locations assigned addresses (RU+0) and (RU+1). Similarly, a pair of an input variable x2 and a label PM is included in two rules (the number of rules=2), and the rules are a rule 3 and a rule 7. Consequently, 3 and 7 are respectively stored as rule numbers in storage locations assigned addresses (RU+2) and (RU+3). Since a pair of an input variable x1 and a label PS is included in only one rule 10, 10 is stored as a rule number in a storage location assigned an address (RU+4). Since a pair of an input variable x2 and a label NS is not included in any rule, no rule number related to the pair of an input variable x2 and a label NS is stored. A numeral in a parenthesis shown in FIG. 29 is a rule number in the present embodiment.

(The number of all rules)×(the number of input variables) words or less are sufficient for the capacity of the rule number area. In the present embodiment, the capacity is 10×4=40 words or less, and 23 words are actually sufficient.

Data describing a consequent of a rule set is further stored in the rule memory area in the RAM 11. This data may represent the relationship among an output variable, a label and a rule number.

The conformity area in the RAM 11 may have a capacity for storing one conformity data as described above. That is, one word is sufficient for the capacity.

In the above described manner, the minimum capacities are sufficient for the capacities of the rule memory area and the conformity area in the RAM 11.

Figure 30:
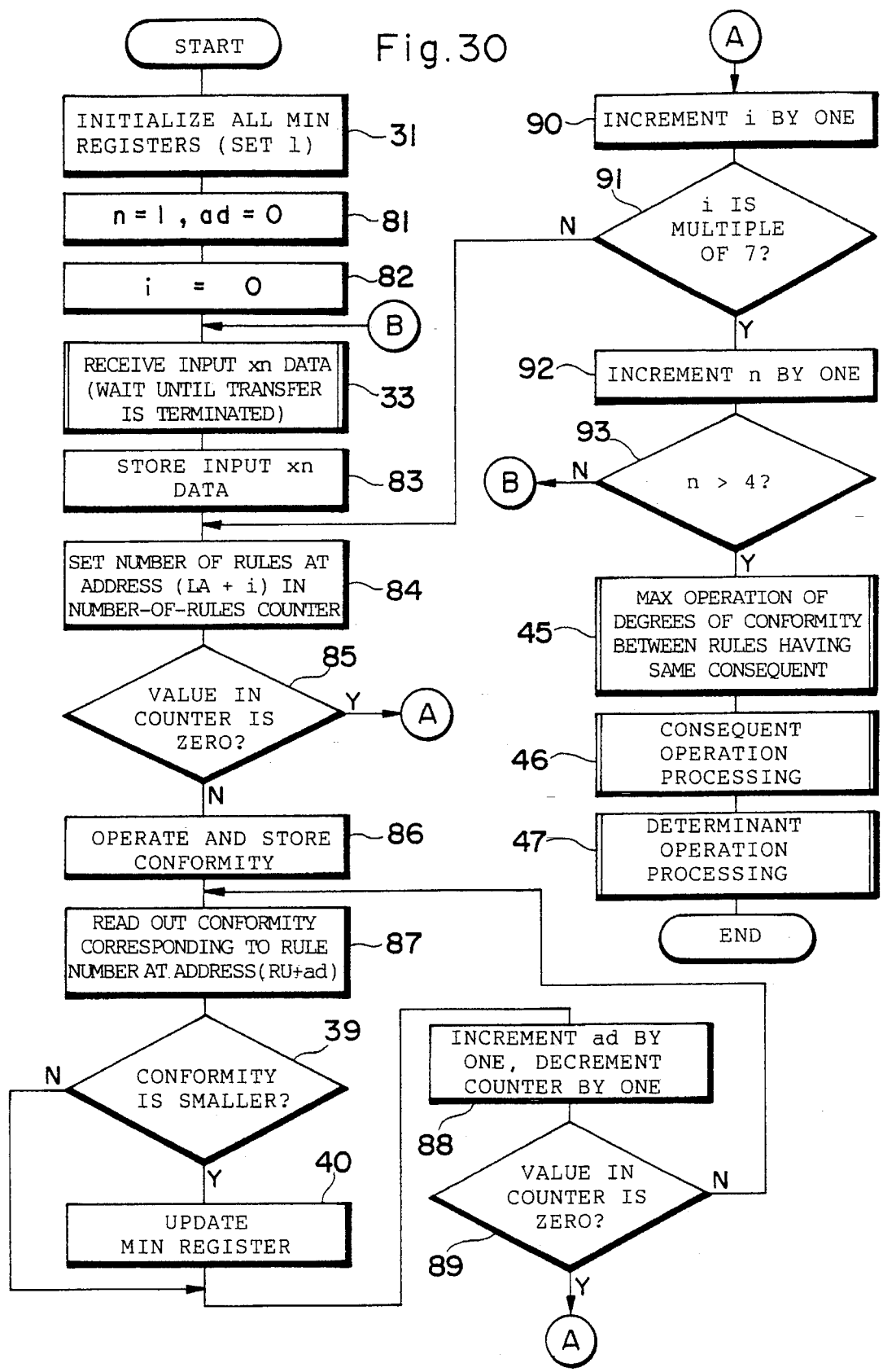
FIG. 30 is a flow chart showing the procedure of fuzzy reasoning processing in the fifth embodiment.

FIG. 30 shows the procedure of fuzzy reasoning processing performed by the CPU 10. In FIG. 30, the same processing steps as those shown in FIG. 4 are assigned the same numbers to omit the overlapped description. Also in this case, it is assumed that input data are transferred in the order of input variable numbers.

All MIN registers are initialized (step 31) and then, a counter n indicating an input variable number is initialized to 1, and an address counter ad indicating a relative address (other than RU) in the rule number area is initialized to 0 (step 81).

Furthermore, an address counter i indicating a relative address (other than LA) in the number-of-rules area is initialized to 0 (step 82).

When input data concerning the first input variable x1 is received (step 33), the input data is transferred to a work area in the RAM 11 from a buffer 14 (step 83).

First, the number-of-rules area is referred to. The number of rules stored in a storage location, in the number-of-rules area, designated by an address (LA+i) (an address LA at first because i is 0) (the number of rules in the storage location assigned the address LA is 2) is set in a number-of-rules counter (step 84).

If the value set in the number-of-rules counter is 0 (step 85) (for example, in a case where the number of rules stored is 0 as in the above described storage location assigned the address (LA+11)), the pair of an input variable and a label does not exist in any rule, so that processing in the steps 86 to 89 is skipped. In such a manner, useless processing is omitted.

If the value set in the number-of-rules counter is not 0 (step 85), the degree of conformity of input data received to a membership function is obtained with respect to a pair of an input variable and a label determined by the address (LA+i) (an address in the rule number area and a pair is in a one-to-one correspondence as described above) (step 86). For example, when i=0, the degree of conformity of input data concerning an input variable x1 to a membership function PL is found and is stored in the conformity area.

Subsequently, the rule number area is referred to. A rule number stored in a storage location, in the rule number area, designated by an address (RU+ad) (a rule number stored in a storage location assigned an address RU is 1 when ad=0) is read out, and the degrees of conformity stored in the MIN register corresponding to the read rule number is read out (step 87).

The degree of conformity obtained in the step 86 and the degree of conformity read out of the MIN register in the step 87 are compared with each other. If the degree of conformity obtained is smaller, the degree of conformity obtained is stored in a corresponding MIN register, to update the degree of conformity (steps 39 and 40).

The counter ad indicating a relative address in the rule number area is incremented by one, and the number-of-rules counter is decremented by one (step 88).

Processing in the steps 87 to 88 is repeated until the value set in the number-of-rules counter becomes 0 (step 89). More specifically, the degree of conformity obtained with respect to one pair of an input variable and a label using input data given is sequentially compared with the degrees of conformity in Pules including the pair (the rule number of the rule is stored in the rule number area), to update the degrees of conformity.

If the value set in the number-of-rules counter becomes 0, processing with respect to one pair is terminated, so that the counter i indicating a relative address in the number-of-rules area is incremented by one so as to refer to the succeeding storage location in the number-of-rules area again (step 90).

Since seven types of labels are combined with one input variable, processing in the steps 84 to 90 is repeated seven times. If the value set in the counter i becomes a multiple of seven (step 91), the counter n indicating an input variable number is incremented so as to start to processing with regard to the succeeding input variable (step 92), so that the program is returned to the step 33 and waits until the succeeding input data is received.

When the above described processing is terminated with regard to all input variables (step 93) (when the value set in the counter n exceeds 4 because the number of input variables is four in the present embodiment), the above described MAX operation, consequent processing and determinant operation processing are performed (steps 45 to 47).

In the above described fifth embodiment, it is assumed that input data are transferred in a predetermined order of input variables. It is also possible to transfer the input data in an arbitrary order as in the third and fourth embodiments.

As shown in FIG. 12 for the above described third embodiment, input data is transferred in such a form that an input variable number indicating an input variable of the input data is added to the input data. For example, the input data is composed of eight bits, and the input variable number is composed of eight bits.

By an input variable number given along with input data, a storage location corresponding to a pair related to an input variable specified by the input variable number in the number-of-rules area is accessed. More specifically, in FIG. 30, the counter i indicating a relative address in the number-of-rules area may be preset when input data is received using an input variable number added to the input data. For example, i may be respectively taken as 0, 7, 14 and 21 when the input variable is x1, x2, x3 and x4. In FIG. 30, initialization processing in the step 82 is not required.

A process completion flag area as shown in FIG. 13 is provided in the RAM 11 so as to judge whether or not antecedent processing is terminated with regard to all input variables.

The process completion flag area stores process completion flags in conformity to input variables. The precess completion flag is initially reset to 0, and is set to 1 in place of the processing in the step 92 shown in FIG. 30 when antecedent processing is terminated with regard to an input variable. When it is confirmed that the process completion flags are set to 1 with respect to all input variables, the program proceeds to a MAX operation of the degrees of conformity between rules having the same consequent (step 45) in place of the judgement in the step 93 shown in FIG. 30.

In the above described manner, even if input data are given in an arbitrary order, it is possible to perform antecedent processing with regard to preceding input data which have been given during the transfer of the succeeding input data, as shown in FIG. 16.

In the above described fifth embodiment and its modified example, it is assumed that antecedent processing with regard to input data previously received is completed during a short time period elapsed until the transfer of input data subsequently transferred is terminated, as can be seen from FIGS. 5 and 16.

When it takes relatively long to perform antecedent processing with regard to one input variable because the number of rules is large or when the transfer rate of input data is relatively high, there occurs a situation where during the execution of antecedent processing with regard to a preceding input variable of input data previously received, the reception of the succeeding input data is completed. Not less than two input data may, in some cases, be subsequently received during the execution of the antecedent processing with regard to the preceding input data.

The input data subsequently received are temporarily stored, thereby to make it possible to cope with such a situation, as in the above described fourth embodiment.

There are two methods of temporarily storing succeeding input data.

One is a method of temporarily storing in a memory such as a RAM input data received by interruption processing utilizing as a trigger a receiving completion signal of the input data.

As shown in FIG. 25 referred to in the fourth embodiment, after input data concerning an input variable x1 (including, in some cases, an input variable number) is received, antecedent processing is performed with regard to the input variable x1. When input data concerning the succeeding input variable x2 is received during the execution of the antecedent processing with regard to the input variable x1, the antecedent processing with regard to the input variable x1 is temporarily interrupted, and storage processing (interruption processing) of the received input data concerning the input variable x2 in the RAM 11 is performed. When the storage processing of the input data concerning the input variable x2 in the RAM 11 is terminated, the antecedent processing with regard to the input variable x1 is resumed again. The same is true for a case where during the execution of antecedent processing with regard to another input variable, input data concerning still another input variable is received. Processing in the step 33 shown in FIG. 30 is replaced with processing for checking to see whether or not there is input data received and stored in the RAM 11.

The second method of temporarily storing succeeding input data is one utilizing an FIFO (First in First Out) memory.

Input data (including, in some cases, an input variable number added to the input data) received by a serial transmission interface 13 is stored in the FIFO memory in the order in which they are received.

The CPU 10 refers to the FIFO memory in place of the processing in the step 33 shown in FIG. 30 every time antecedent processing is terminated with regard to each input variable, to check to see whether or not input data to be subsequently processed is temporarily stored in the FIFO memory. If input data are stored in the FIFO memory, the input data are read out of the FIFO memory in the order in which they are received, to execute antecedent processing with regard to the read input data. On the other hand, if no input data is stored, the control waits until input data is received.

As shown in FIG. 26 referred to in the fourth embodiment, after input data concerning the first input variable x1 is received, antecedent processing for each input variable is successively performed so long as input data to be subsequently processed exists in the FIFO memory.

In the above described embodiment, it is also possible to omit the number-of-rules area. In this case, a table indicating a correspondence between a start address at the start of storage locations grouped for each input variable in the rule number area and the input variable is provided so that the rule number area can be accessed by an input variable number of the input variable. In addition, an end code may be stored at the end of storage locations grouped for each identical pair (a pair of an input variable and a label) so that the storage locations grouped can be distinguished.

Furthermore, if a table indicating a correspondence between a start address of storage locations grouped for each input variable and the input variable number is provided in the number-of-rules area shown in FIG. 28, it is not necessary to arrange data each representing the number of rules in the order of input variable numbers.

As described in the foregoing, a fuzzy reasoning processor according to the present invention can be realized by not only a general purpose computer but also a hardware processor having architecture dedicated to fuzzy reasoning processing.

Figure 31:
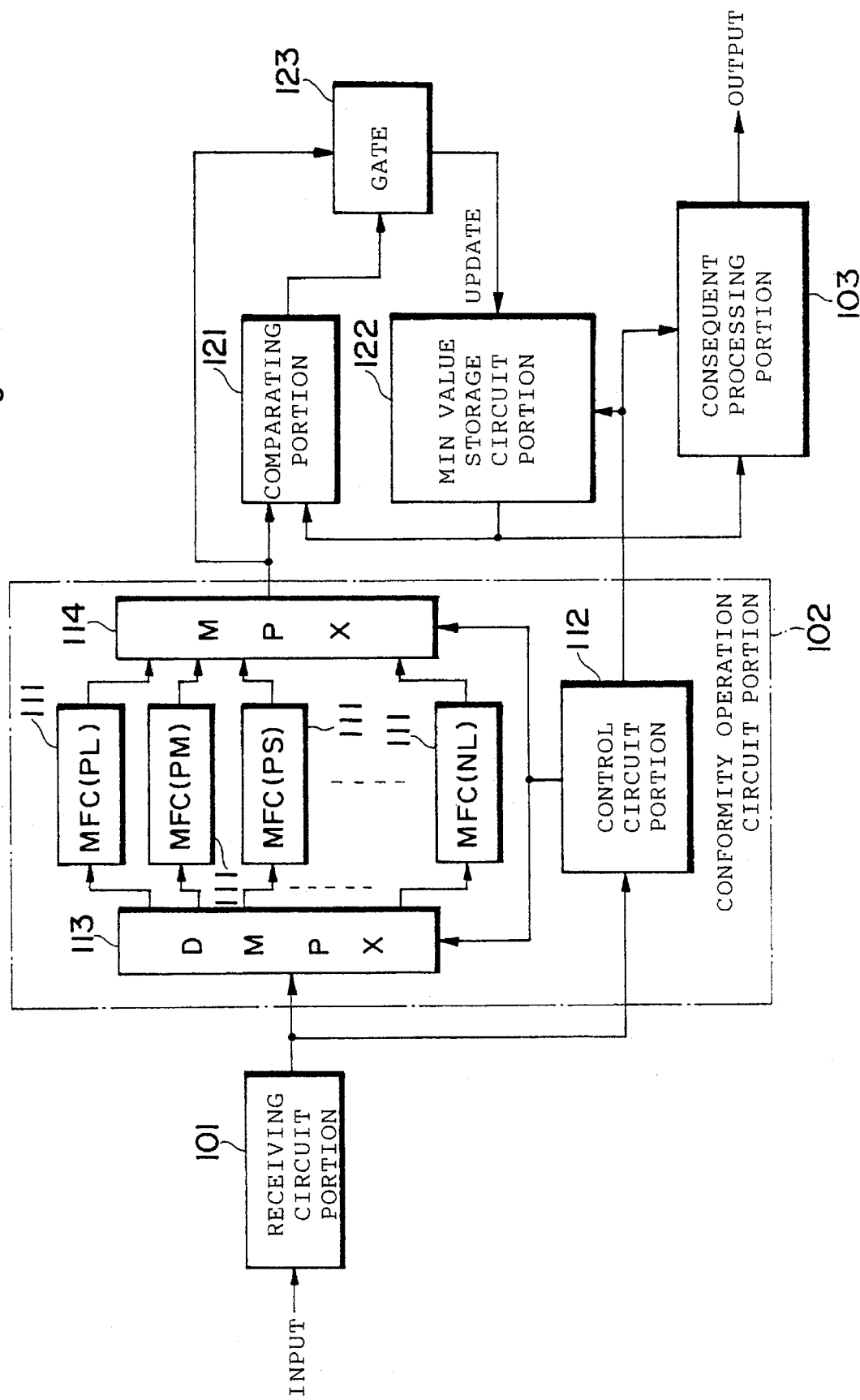
FIG. 31 is a block diagram illustrating an example in which a fuzzy reasoning processor according to the present invention is realized by an electric circuit arrangement.

FIG. 31 illustrates an example in which a fuzzy reasoning processor is realized by a hardware circuit arrangement. This circuit block can be also understood as one in which a plurality of functions of a general purpose processor (computer) so programmed as to allow fuzzy reasoning processing are expressed by blockes. Consequently, each circuit portion or circuit means must be interpreted as one including not only a hardware circuit but also a part of a computer so programmed as to allow fuzzy reasoning processing.

By the arrangement shown in FIG. 31, the above described first and second embodiments are realized as follows.

A receiving circuit portion 101, which corresponds to the serial transmission interface 13, receives an input variable signal representing input data and feeds the input variable signal received to a conformity operation circuit portion 102 in the succeeding stage.

The conformity operation circuit portion 102 comprises a plurality of membership function circuit portions 111. All membership functions included in antecedents of all rules set are respectively set in the membership function circuit portions 111. For example, there are provided seven membership function circuit portions 111 in which the above described membership functions having the labels PL, PM, PS, ZR, NS, NM and NL are respectively set. When the input variable signal representing input data is given, the membership function circuit portions 111 respectively output conformity signals representing the degrees of conformity of the input data to the membership functions (membership function values or grades).

A control circuit portion 112 included in the conformity operation circuit portion 102 comprises a storage circuit portion storing rules as shown in FIG. 3 (first embodiment) or FIG. 8 (second embodiment). The control circuit portion 112 controls, when an input variable signal is applied, a demultiplexer portion 113 and a multiplexer portion 114 so that the input variable signal is inputted to the membership function circuit portions 111, in which the membership functions in the antecedents to which an input variable of the input variable signal is related are respectively set, through the demultiplexer portion 113 sequentially (in a constant period) and the conformity signals outputted from the selected membership function circuit portions 111 to which the input variable signal is inputted are fed to a comparison circuit portion 121 in the succeeding stage through the multiplexer portion 114 sequentially (in synchronism with the above described period). When the input variable signal is applied, therefore, the degrees of conformity to all the membership functions in the antecedents to which an input variable of the input variable signal is related are sequentially obtained for each rule (not all rules).

A MIN value storage circuit portion 122, which corresponds to the MIN registers set in the RAM 11, stores the minimum value of the degrees of conformity for each rule with respect to all the rules. This minimum value is initialized to 1 (the maximum value) prior to a fuzzy reasoning operation.

Every time a conformity signal is inputted to the comparison circuit portion 121, the minimum value of the degrees of conformity for a rule to which the conformity signal is related is read out of the MIN value storage circuit portion 122 under control of the control circuit portion 112 and is given to the comparison circuit portion 121. The comparison circuit portion 121 compares the degree of conformity represented by the conformity signal inputted with the minimum value read out of the MIN value storage circuit portion 122, to generate an output signal when the degree of conformity is smaller than the minimum value. A gate portion 123 is enabled by the output signal. Accordingly, the conformity signal is applied to the MIN value storage circuit portion 122 through the gate portion 123, and the minimum value stored in the storage circuit portion 122 is replaced with the degree of conformity represented by the conformity signal, to update the minimum value.

The above described operation is executed every time an input variable signal is inputted. When all input variable signals are inputted and all operations are terminated with regard to the input variable signals, the minimum value of the degrees of conformity for each rule in the MIN value storage circuit portion 122 is transferred to a consequent processing circuit portion 103, so that the same consequent operation as the processing in the steps 45 to 47 is executed, to output the final result of reasoning.

In the third embodiment, an input variable signal is constituted by an input signal representing input data and a code signal representing an input variable number. The receiving circuit portion 101 feeds, when it receives the input variable signal, the input signal to the demultiplexer portion 113 and the code signal to the control circuit portion 112. Rule data in the arrangement as shown in FIG. 14 is set in the control circuit portion 112. When the code signal is applied, the control circuit portion 112 controls the demultiplexer portion 113 and the multiplexer portion 114 in accordance with rule data related to an input variable specified by the input variable number represented by the code signal.

In the fourth embodiment, the receiving circuit portion 101 comprises a storage circuit portion corresponding to the buffer memory 14 or the FIFO memory 25, and feeds an input variable signal stored in the storage circuit portion to the conformity operation circuit portion 102 every time operation processing is terminated with regard to the preceding input variable signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuzzy reasoning processing method, comprising the steps of:

setting all input variables in an antecedent of each of a plurality of rules;

relating a membership function to the input variable;

assigning a code to the input variable to which no membership function is related to establish the antecedent of the rule;

receiving input data of one input variable;

executing antecedent processing for each such input variable for which input data is received; and enabling reception of input data of another input variable while performing said executing step on said received input data of one input variable;

determining in antecedent processing with regard to each of the input variables whether or not a membership function is related to the input variable for each rule so that said executing step will only be performed with regard to an input variable to which a membership function is related.

2. The fuzzy reasoning processing method according to claim 1, further comprising the step of executing antecedent processing when input data is received with regard to an input variable associated with said received input data.

3. The fuzzy reasoning processing method according to claim 1, further comprising the steps of temporarily storing said received input data in storage means for storing received input data, determining whether or not input data is stored in said storage means, reading out the stored input data based upon the outcome of said storage determining step and executing antecedent processing with regard to an input variable of said read out input data.

4. A fuzzy reasoning processing method, comprising the steps of:

previously setting pairs of input variables and membership functions constituting antecedents of a plurality of rules for each input variable and in connection with identification codes for each membership function included in a respective pair;

receiving input data for each of said pairs associated with one of said input variables;

executing antecedent processing on said input data with regard to all of said pairs to which such one input variable is related and then, performing antecedent processing with regard to all of said pairs to which such another input variable is related for which input data has been received; and enabling reception of input data of another input variable while performing said executing step on said received input data of one input variable.

5. The fuzzy reasoning processing method according to claim 4, further comprising the step of executing antecedent processing when input data is received with regard to all of said pairs to which an input variable of said given input data is related.

6. The fuzzy reasoning processing method according to claim 4, further comprising the steps of temporarily storing said received input data in storage means for storing received input data, determining whether or not input data is stored in said storage means, reading out the stored input data based upon the outcome of said storage determining step and executing antecedent processing with regard to all of said pairs to which an input variable of the input data read out is related.

7. A fuzzy reasoning processor, comprising:

a memory for setting pairs of input variables and membership functions constituting antecedents of a plurality of rules for each input variable and in connection with identification codes for each membership function included for a respective pair;

receiving means for receiving input data for each input variable; and antecedent processing means for executing antecedent processing for each input variable for which input data is received with regard to all of said pairs to which such one input variable is related and for performing antecedent processing with regard to all of said pairs to which such another input variable is related and for which input data is received.

8. The fuzzy reasoning processor according to claim 7, wherein said antecedent processing means executes antecedent processing when input data is received with regard to all of said pairs to which an input variable of the received input data is related.

9. The fuzzy reasoning processor according to claim 7, which further comprises storage means for temporarily storing input data received, said antecedent processing means determining whether or not input data is stored in said storage means, determining when said input data is being read out, when input data is stored, and executing antecedent processing with regard to all of said pairs to which an input variable of the input data read out is related.

* * * * *